(12) United States Patent
Chai et al.

(10) Patent No.: US 9,376,140 B2
(45) Date of Patent: Jun. 28, 2016

(54) STEERING CONTROL DEVICE

(71) Applicant: NISSAN MOTOR CO., LTD., Yokohama-shi, Kanagawa (JP)

(72) Inventors: Yu wun Chai, Isehara (JP); Kazuhiro Igarashi, Ebina (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/759,701

(22) PCT Filed: Dec. 27, 2013

(86) PCT No.: PCT/JP2013/007689
§ 371 (c)(1),
(2) Date: Jul. 8, 2015

(87) PCT Pub. No.: WO2014/108983
PCT Pub. Date: Jul. 17, 2014

(65) Prior Publication Data
US 2015/0353124 A1 Dec. 10, 2015

(30) Foreign Application Priority Data

Jan. 11, 2013 (JP) .................................. 2013-003873

(51) Int. Cl.
*B62D 6/00* (2006.01)
*B62D 5/04* (2006.01)
*B62D 6/02* (2006.01)
*B62D 6/08* (2006.01)

(52) U.S. Cl.
CPC ............ *B62D 5/0463* (2013.01); *B62D 5/0421* (2013.01); *B62D 5/0466* (2013.01); *B62D 6/008* (2013.01); *B62D 6/02* (2013.01); *B62D 6/08* (2013.01)

(58) Field of Classification Search
CPC ............ B62D 6/00; B62D 15/02; G06K 9/00
See application file for complete search history.

(56) References Cited

U.S. PATENT DOCUMENTS

| | | | | |
|---|---|---|---|---|
| 6,265,991 | B1 * | 7/2001 | Nishiwaki | G01S 7/295 340/435 |
| 7,584,816 | B2 * | 9/2009 | Miyajima | B62D 5/006 180/421 |
| 7,832,522 | B2 * | 11/2010 | Akuta | B62D 6/002 180/400 |
| 2006/0011404 | A1 * | 1/2006 | Goto | B62D 6/002 180/402 |
| 2008/0162001 | A1 | 7/2008 | Chai et al. | |

(Continued)

FOREIGN PATENT DOCUMENTS

EP 2772410 A1 9/2014
JP 2000108914 A 4/2000

(Continued)

*Primary Examiner* — Thomas Tarcza
*Assistant Examiner* — Alex C Dunn
(74) *Attorney, Agent, or Firm* — Young Basile Hanlon & MacFarlane P.C.

(57) ABSTRACT

A control computing unit calculates current axial force of a steering rack based on a turning current. Moreover, the control computing unit calculates lateral axial force of the steering rack based on a lateral acceleration. Then, the control computing unit calculates steering reaction force based on the current axial force at a time of a steering increasing operation of a steering wheel, and calculates the steering reaction force based on the current axial force and the lateral axial force at a time of a steering returning operation of the steering wheel.

7 Claims, 13 Drawing Sheets

(56) References Cited

U.S. PATENT DOCUMENTS

| | | | |
|---|---|---|---|
| 2008/0185213 A1 | 8/2008 | Mori et al. | |
| 2009/0265062 A1* | 10/2009 | Nguyen Van | B62D 15/025 701/42 |
| 2010/0250064 A1* | 9/2010 | Ota | B60W 40/076 701/36 |
| 2011/0227781 A1* | 9/2011 | Nitanda | B60W 40/06 342/70 |
| 2012/0271516 A1* | 10/2012 | Takahashi | B62D 5/0472 701/42 |
| 2014/0012469 A1* | 1/2014 | Kunihiro | B60W 40/072 701/41 |

FOREIGN PATENT DOCUMENTS

| | | |
|---|---|---|
| JP | 2006069351 A | 3/2006 |
| JP | 2006137215 A | 6/2006 |
| JP | 2007137287 A | 6/2007 |
| JP | 2008162398 A | 7/2008 |
| JP | 2008189107 A | 8/2008 |
| JP | 2010143303 A | 7/2010 |

* cited by examiner

STEERING CONTROL DEVICE

CROSS REFERENCE TO RELATED APPLICATION

Priority is claimed to Japanese Patent Application No. 2013-3873 (filed on Jan. 11, 2013), the entire content of which is incorporated by reference as a part of this disclosure.

TECHNICAL FIELD

The present disclosure relates to a steering control device of a Steer By Wire system, in which a steering wheel and steered wheels are mechanically separated from each other.

BACKGROUND

As a technology of a steering control device, for example, there has been prior art described in JP 2000-108914 A.

In this technology, a steering reaction force is generated based on a rack axial force acting on a steering rack, so that a tire lateral force acting on tires is reflected on the steering reaction force.

Here, in the above-described technology, the steering reaction force is generated based on the rack axial force, and accordingly, an axial force sensor that detects the rack axial force is demanded. However, the axial force sensor is relatively expensive. Therefore, there has been a possibility that manufacturing cost of the steering control device may be increased.

SUMMARY

The present disclosure has been made by focusing attention on such a point as described above, and has an object to make it possible to suppress the increase of the manufacturing cost.

In order to solve the above-described problem, in one embodiment of the present disclosure, current axial force of a steering rack is calculated based on a turning current. Moreover, in an aspect of the present disclosure, a lateral G axial force of the steering rack is calculated based on a lateral acceleration. Then, in an aspect of the present disclosure, steering reaction force is calculated based on the current axial force at a time of a steering increasing operation of a steering wheel, and the steering reaction force is calculated based on the current axial force and the lateral G axial force at a time of a steering returning operation of the steering wheel.

In one embodiment of the present disclosure, driving of a reaction force actuator is calculated based on detection results of sensors provided in a general vehicle, the detection results including the turning current, the lateral acceleration and the like. Therefore, in one embodiment of the present disclosure, it is not necessary for the steering control device to include a dedicated sensor, and the increase in manufacturing cost can be suppressed.

DETAILED DESCRIPTION OF THE EMBODIMENTS

Next, a description is made of embodiments of the present disclosure with reference to the drawings.

(Configuration)

A vehicle A in one embodiment of the present disclosure is a vehicle including a steering control device of a Steer By Wire system, in which a steering wheel 1 and front wheels (hereinafter, referred to as steered wheels) 2 are mechanically separated from each other.

Figure 1:
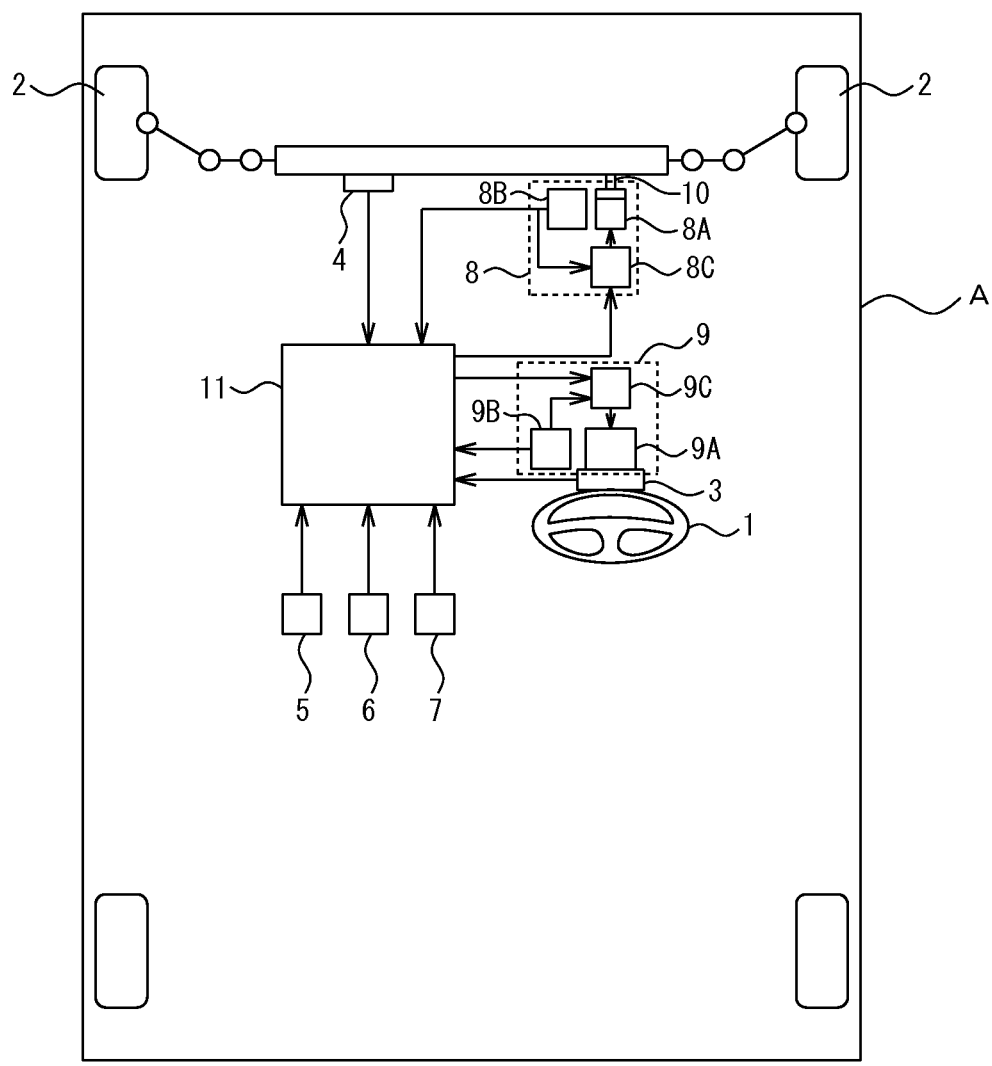
FIG. 1 is a conceptual diagram illustrating a configuration of a vehicle A.

FIG. 1 is a conceptual diagram illustrating a configuration of the vehicle A in one embodiment of the present disclosure. As illustrated in FIG. 1, the vehicle A includes a steering angle sensor 3, a turning angle sensor 4, a vehicle velocity sensor 5, a lateral G sensor 6, and a yaw rate sensor 7.

The steering angle sensor 3 detects a steering angle δ of the steering wheel 1. As a method for detecting a steering angle δ, for example, a calculation method that is based on a rotation amount of a steering shaft can be employed. Then, the steering angle sensor 3 outputs a signal (hereinafter, also referred to as a detection signal) indicating a result of the detection to a control computing unit 11 to be described later.

The turning angle sensor 4 is configured to detect a turning angle θ of the steered wheels 2. As a method for detecting the turning angle θ, for example, a calculation method that is based on a rack movement amount of a steering rack can be employed. Then, the turning angle sensor 4 outputs a detection signal to the control computing unit 11.

The vehicle velocity sensor 5 is configured to detect a vehicle velocity V of the vehicle A. Then, the vehicle velocity sensor 5 outputs a detection signal to the control computing unit 11.

The lateral G sensor 6 is configured to detect a lateral acceleration Gy acting on the vehicle A (that is, a state function of the vehicle A, which is varied by tire lateral force Fd acting on the steered wheels 2). Then, the lateral G sensor 6 outputs a detection signal to the control computing unit 11.

The yaw rate sensor 7 is configured to detect a yaw rate γ of the vehicle A (that is, a state function of the vehicle A, which is varied by the tire lateral force Fd acting on the steered wheels 2). Then, the yaw rate sensor 7 outputs a detection signal to the control computing unit 11. Note that the lateral G sensor 6 and the yaw rate sensor 7 are disposed in a sprung body (vehicle body).

Moreover, the vehicle A includes a turning control unit 8 and a reaction force control unit 9. The turning control unit 8 is configured to include a turning motor 8A, a turning current detecting unit 8B, and a turning motor drive unit 8C.

The turning motor 8A is coupled to a pinion shaft 10 via a speed reducer. Then, the turning motor 8A is driven by the turning motor drive unit 8C, and moves the steering rack from side to side via the pinion shaft 10. In such a way, the turning motor 8A steers the steered wheels 2. As a method for driving the turning motor 8A, for example, a method of controlling a current flowing through the turning motor 8A (hereinafter, this current is also referred to as a turning current) can be employed.

The turning current detecting unit 8B is configured to detect the turning current (a state function of the vehicle A, which is varied by the tire lateral force Fd acting on the steered wheels 2). Then, the turning current detecting unit 8B outputs a detection signal to the turning motor drive unit 8C and the control computing unit 11.

The turning motor drive unit 8C is configured to control the turning current of the turning motor 8A based on a target turning current calculated by the control computing unit 11 so that the turning current detected by the turning current detecting unit 8B can coincide with the target turning current concerned. In such a way, the turning motor drive unit 8C drives the turning motor 8A. The target turning current is a target value of the current flowing through the turning motor 8A.

The reaction force control unit 9 is configured to include a reaction force motor 9A, a reaction force current detecting unit 9B, and a reaction force motor drive unit 9C. The reaction force motor 9A is coupled to the steering shaft via a speed reducer. Then, the reaction force motor 9A is driven by the reaction force motor drive unit 9C, and applies rotary torque to the steering wheel 1 via the steering shaft. In such a way, the reaction force motor 9A generates steering reaction force. As a method for driving the reaction force motor 9A, for example, there can be employed a method of controlling a current flowing through the reaction force motor 9A (hereinafter, this current is also referred to as a reaction force current).

The reaction force current detecting unit 9B is configured to detect the reaction force current. Then, the reaction force current detecting unit 9B outputs a detection signal to the reaction force motor drive unit 9C and the control computing unit 11.

The reaction force motor drive unit 9C is configured to control the reaction force current of the reaction force motor 9A based on a target reaction force current calculated by the control computing unit 11 so that the reaction force current detected by the reaction force current detecting unit 9B can coincide with the target reaction force current concerned. In such a way, the reaction force motor drive unit 9C drives the reaction force motor 9A. The target reaction force current is a target value of the current flowing through the reaction force motor 9A.

Figure 2:
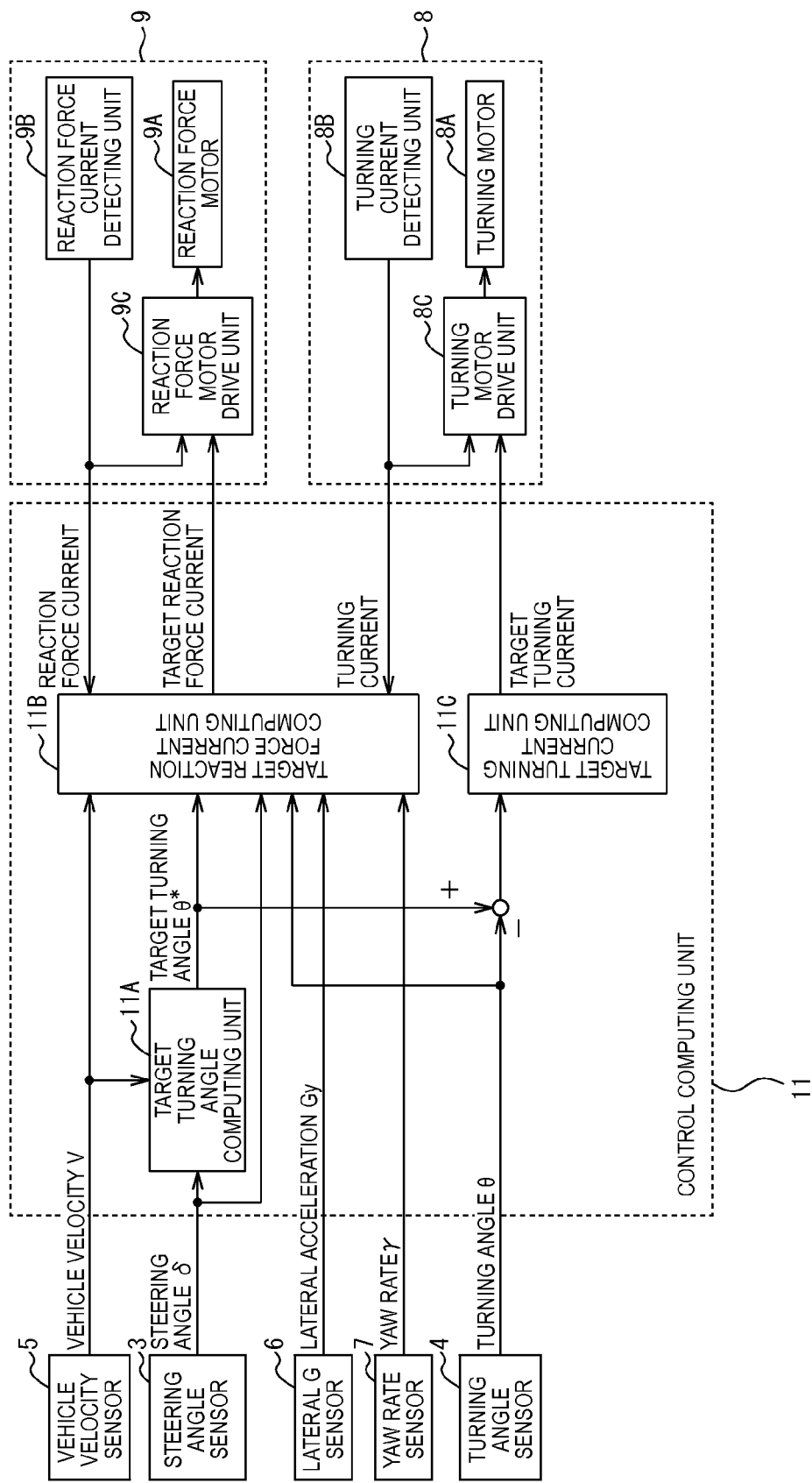
FIG. 2 is a block diagram illustrating a configuration of a control computing unit 11.

The vehicle A includes the control computing unit 11. FIG. 2 is a block diagram illustrating the configuration of the control computing unit 11. As illustrated in FIG. 2, the control computing unit 11 is configured to include a target turning angle computing unit 11A, a target reaction force current computing unit 11B, and a target turning current computing unit 11C.

The target turning angle computing unit 11A is configured to calculate a target turning angle $\theta^*$, which is a target value of the turning angle $\theta$ (rotation angle of the pinion shaft 10), based on the steering angle $\delta$ detected by the steering angle sensor 3 and on the vehicle velocity V detected by the vehicle velocity sensor 5. As a method for calculating the target turning angle $\theta^*$, for example, there is a method of employing a multiplied value of the steering angle $\delta$ and a variable gear ratio of the steering angle $\delta$ and the turning angle $\theta$. Then, the target turning angle computing unit 11A outputs a result of the calculation to the target reaction force current computing unit 11B.

The target reaction force current computing unit 11B is configured to calculate the target reaction force current based on the target turning angle $\theta^*$ calculated by the target turning angle computing unit 11A, on the vehicle velocity V detected by the vehicle velocity sensor 5, and on the turning current detected by the turning current detecting unit 8B. Then, the target reaction force current computing unit 11B outputs a result of the calculation to the reaction force control unit 9 (the reaction force motor drive unit 9C).

Figure 3:
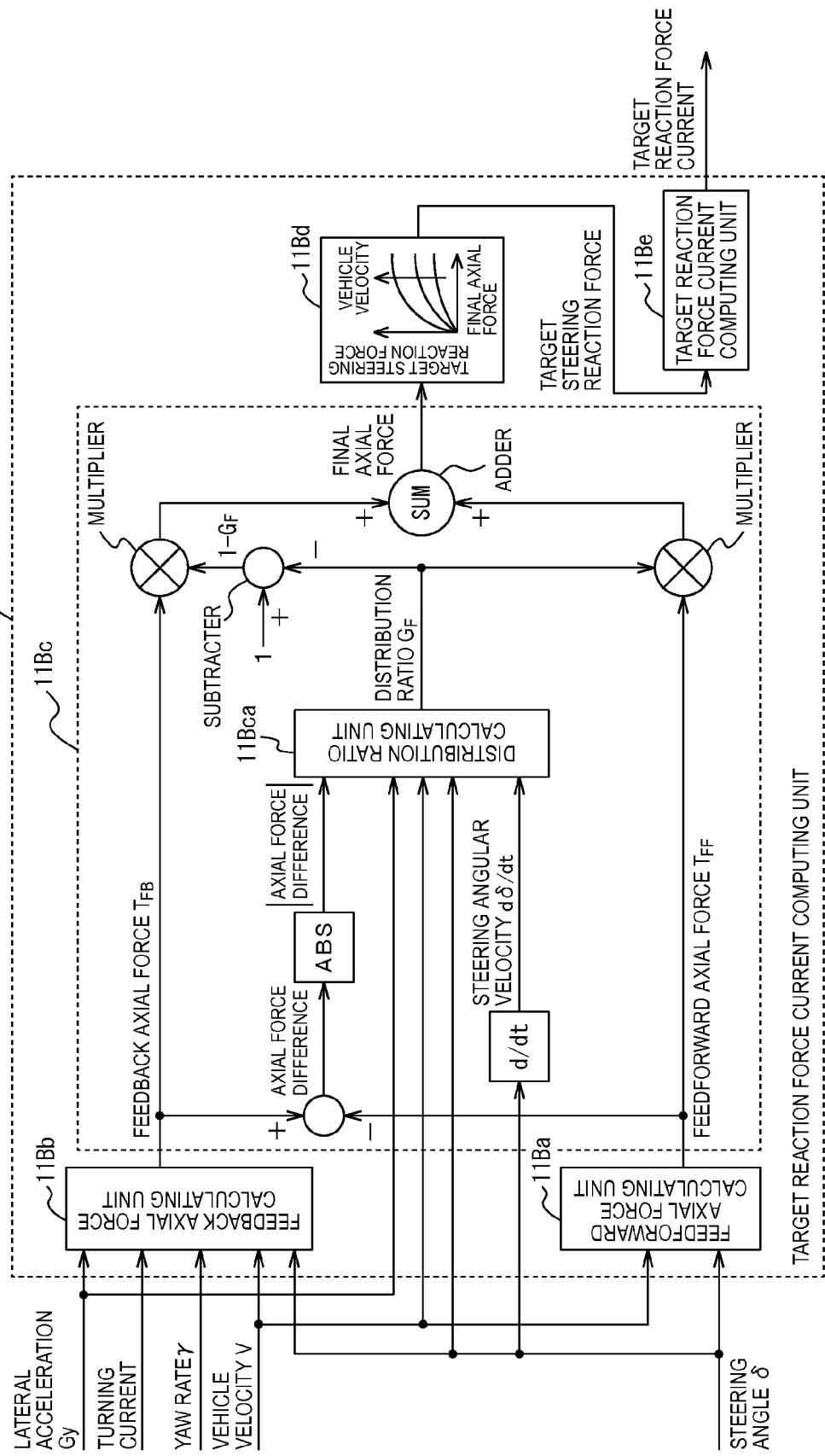
FIG. 3 is a block diagram illustrating a configuration of a target reaction force current computing unit 11B.

Here, a description is made of a configuration of the target reaction force current computing unit 11B. FIG. 3 is a block diagram illustrating the configuration of the target reaction force current computing unit 11B. As illustrated in FIG. 3, the target reaction force current computing unit 11B is configured to include a feedforward axial force calculating unit 11Ba, a feedback axial force calculating unit 11Bb, a final axial force calculating unit 11Bc, an axial force-steering reaction force converting unit 11Bd, and a target reaction force current computing unit 11Be.

Figure 4:
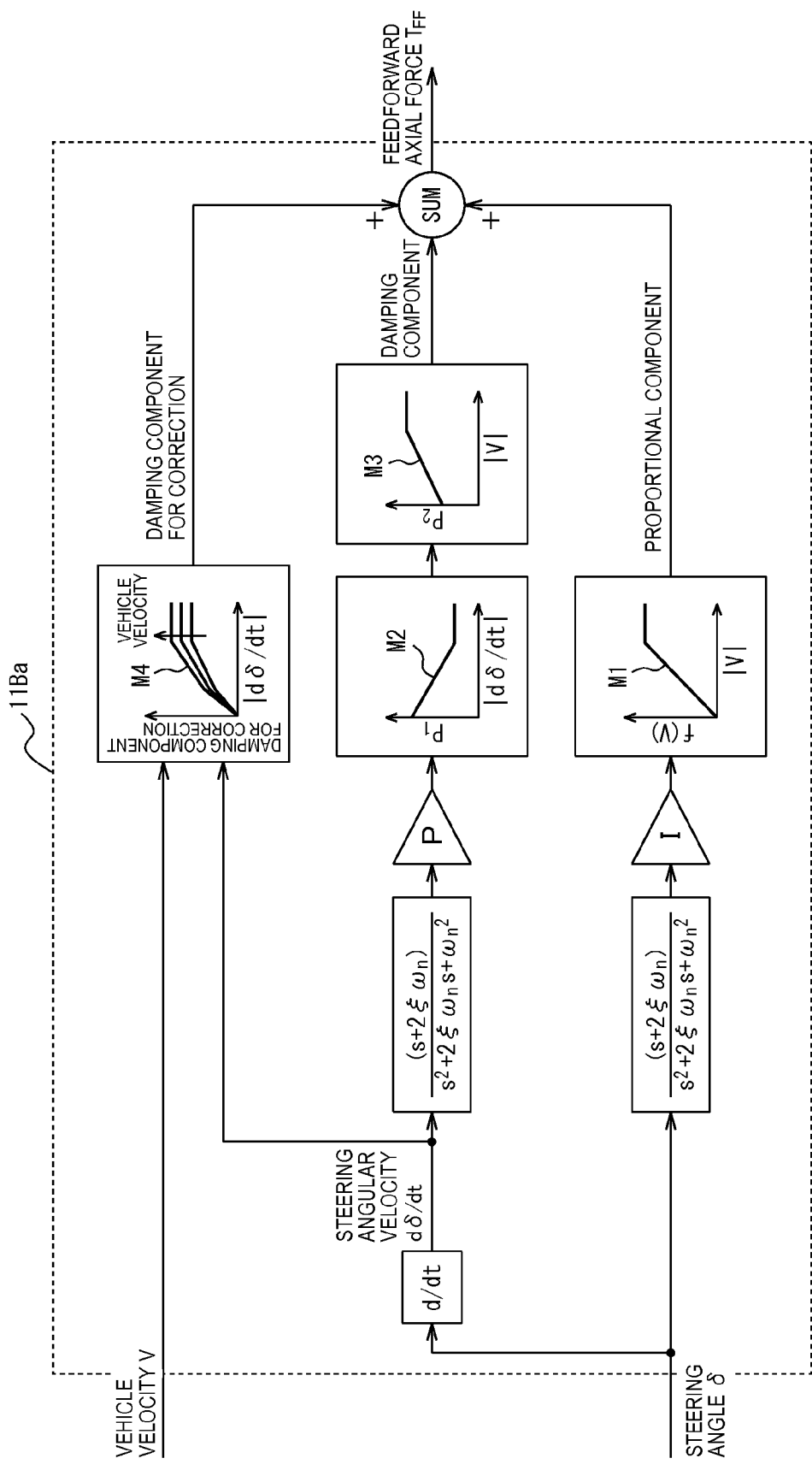
FIG. 4 is a block diagram illustrating a configuration of a feedforward axial force calculating unit 11Ba.

FIG. 4 is a block diagram illustrating a configuration of the feedforward axial force calculating unit 11Ba. As illustrated in FIG. 4, the feedforward axial force calculating unit 11Ba calculates feedforward axial force $T_{FF}$ according to a formula (5), which will be described later, based on the steering angle $\delta$ detected by the steering angle sensor 3 and on the vehicle velocity V detected by the vehicle velocity sensor 5. Then, the feedforward axial force calculating unit 11Ba is configured to output a result of the calculation to the final axial force calculating unit 11Bc (refer to FIG. 2).

Figure 5:
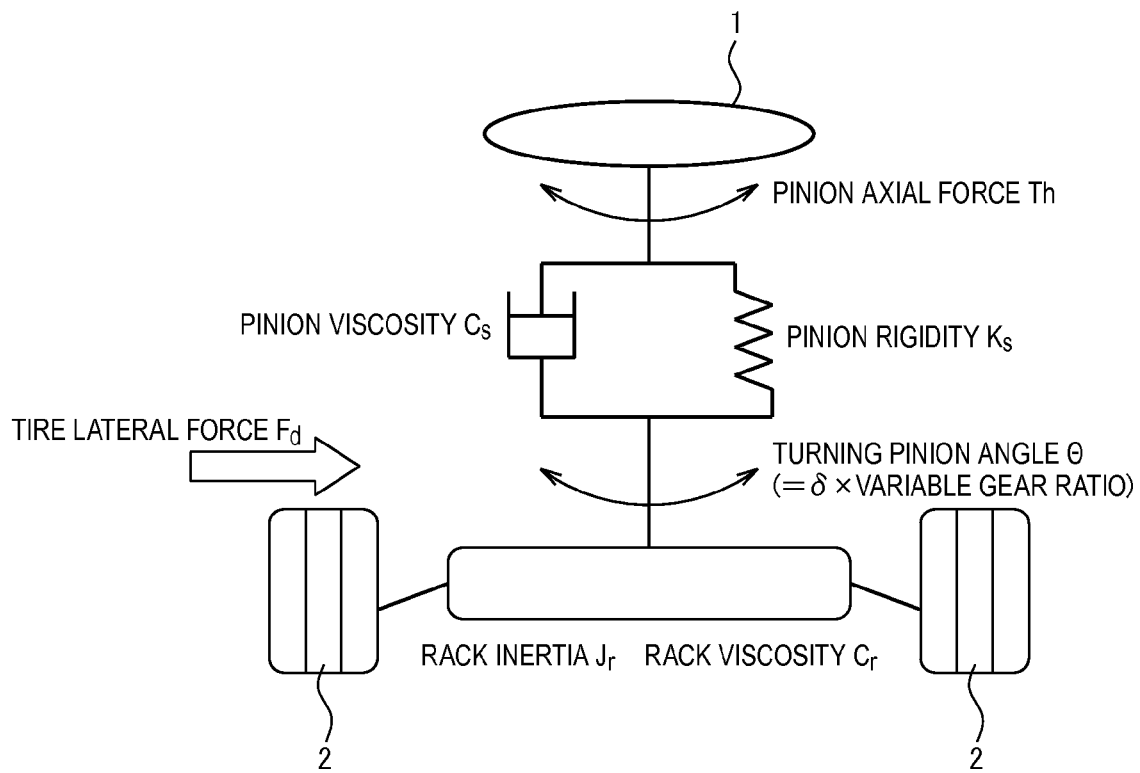
FIG. 5 is a diagram illustrating coefficients of a calculation formula for a pinion axial force Th.

FIG. 5 is a diagram illustrating coefficients of a calculation formula for pinion axial force Th. Here, a relational formula between a turning pinion angle $\theta$ and the pinion axial force Th is represented by the following formula (1) based on a motion equation of a vehicle including a steering mechanism in which the steering wheel 1 and the steered wheels 2 are mechanically connected to each other. As the turning pinion angle $\theta$, for example, there is a rotation angle of the pinion shaft 10. As the rotation angle of the pinion shaft 10, for example, there is a multiplied value of the steering angle $\delta$ and the variable gear ratio of the steering angle $\delta$ and the turning angle $\theta$. Moreover, as the pinion axial force Th, for example, there is steering reaction force applied to the steering wheel 1. A first term of a right side of following formula (1) is a damping term representing a component, which is based on a turning pinion angular velocity $d\theta/dt$, among components composing the pinion axial force Th. Moreover, a second term of the right side is an inertia term representing a component, which is based on a turning pinion angular acceleration $d^2\theta/dt^2$, among the components composing the pinion axial force Th. Furthermore, a third term of the right side is a proportion term representing a component, which is based on the tire lateral force Fd (turning pinion angle $\theta$), among the components composing the pinion axial force Th.

$$Th = Ks(Jr \cdot s^2 + Cr \cdot s)/(Jr \cdot s^2 + (Cr+Cs)s + Ks) \cdot \theta + Cs(Jr \cdot s^3 + Cr \cdot s^2)/(Jr \cdot s^2 + (Cr+Cs)s + Ks) \cdot \theta + (Ks + Cs \cdot s)/(Jr \cdot s^2 + (Cr+Cs)s + Ks) \cdot Fd \quad (1)$$

Note that Ks is pinion rigidity, Cs is pinion viscosity, Jr is rack inertia, and Cr is rack viscosity as shown in FIG. 5.

Moreover, in the above-described formula (1), the second term in the right side, that is, the inertia term contains many noise components, and induces vibrations onto such a calculation result of the pinion axial force Th, and accordingly, the inertia term concerned is removed in one embodiment. Furthermore, the tire lateral force Fd can be defined to depend on the turning pinion angle θ and the vehicle velocity V, and can be represented as Fd=f(V)·θ. As f(V), for example, there is a function changing in response to the vehicle velocity V. Therefore, the above-described formula (1) can be represented as a following formula (2).

$$Th=Ks(Jr \cdot s^2+Cr \cdot s)/(Jr \cdot s^2+(Cr+Cs)s+Ks) \cdot \theta+(Ks+Cs \cdot s)/(Jr \cdot s^2+(Cr+Cs)s+Ks) \cdot f(V) \cdot \theta \quad (2)$$

Figure 6:
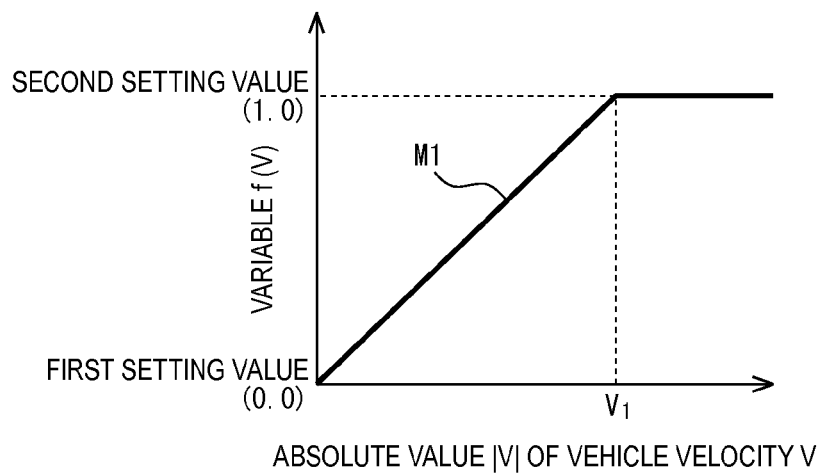
FIG. 6 is a graph illustrating a control map M1.

FIG. 6 is a graph illustrating a control map M1. Here, as a method for setting such a variable f(V), for example, there can be employed a method of reading a variable f(V), which corresponds to an absolute value of the vehicle velocity V, from the control map M1. As the control map M1, for example, there is a map in which the variable f(V) corresponding to the absolute value of the vehicle velocity V is registered. Specifically, as illustrated in FIG. 6, the control map M1 sets the variable f(V) to a first setting value (for example, 0.0) in a case where the absolute value of the vehicle velocity V is 0. Moreover, in a range where the absolute value of the vehicle velocity V is within a first setting vehicle velocity $V_1$ (>0), the variable f(V) is set to a second setting value (>first setting value; for example, 1.0) irrespective of a magnitude of the vehicle velocity V. Furthermore, in a range where the absolute value of the vehicle velocity V is 0 or more and less than the first setting vehicle velocity $V_1$, the control map M1 linearly increases the variable f(V) in response to an absolute value of a turning angular velocity dθ/dt. Specifically, in the range where the absolute value of the vehicle velocity V is 0 or more and less than the first setting vehicle velocity $V_1$, the control map M1 sets the variable f(V) in accordance with a linear function representing a relationship between the absolute value of the vehicle velocity V and the variable f(V). In the linear function, the variable f(V) is set to the first setting value (0.0) in a case where the absolute value of the vehicle velocity V is 0, and the variable f(V) is set to the second setting value (1.0) in a case where the absolute value of the vehicle velocity V is the first setting vehicle velocity V1. In such a way, in a case where the absolute value of the vehicle velocity V is less than the first setting vehicle velocity $V_1$, the feedforward axial force calculating unit 11Ba decreases (reduces) an absolute value of a proportional component as the absolute value of the vehicle velocity V is smaller. Meanwhile, in a case where the absolute value of the vehicle velocity V is the first setting vehicle velocity $V_1$ or more, the feedforward axial force calculating unit 11Ba does not reduce the absolute value of the proportional component irrespective of the magnitude of the vehicle velocity V.

Moreover, the above-described formula (2) can be equivalently represented as a following formula (3).

$$Th=P(s+2 \cdot \zeta \cdot \omega n)s/(s^2+2 \cdot \zeta \cdot \omega n \cdot s+\omega n^2) \cdot \delta+I \cdot (s+2 \cdot \zeta \cdot \omega n)/(s^2+2 \cdot \zeta \cdot \omega n \cdot s+\omega n^2) \cdot f(V) \cdot \delta = P(s+2 \cdot \zeta \cdot \omega n)/(s^2+2 \cdot \zeta \cdot \omega n \cdot s+\omega n^2)d\delta/dt+I \cdot (s+2 \cdot \zeta \cdot \omega n)/(s^2+2 \cdot \zeta \cdot \omega n \cdot s+\omega n^2) \cdot f(V) \cdot \delta \quad (3)$$

Note that P and I are control constants, ζ is an attenuation constant, and ωn is a natural frequency. As a method for setting ζ and ωn, for example, there can be employed a method of setting ζ and ωn to design values, and a method of identifying ζ and ωn from an experimental result. Therefore, the pinion axial force Th, that is, the steering reaction force generated in the steering wheel 1 can be represented by a following formula (4) based on the above-described formula (3).

$$Th=P(s+2 \cdot \zeta \cdot \omega n)/(s^2+2 \cdot \zeta \cdot \omega n \cdot s+\omega n^2)d\delta/dt+I \cdot (s+2 \cdot \zeta \cdot \omega n)/(s^2+2 \cdot \zeta \cdot \omega n \cdot s+\omega n^2) \cdot f(V) \cdot \delta \quad (4)$$

Then, based on the above-described formula (4), that is, based on a numerical formula of the pinion axial force Th, a following formula (5) is employed as a method for calculating the feedforward axial force $T_{FF}$ in one embodiment of the present disclosure.

$$T_{FF}=P \cdot P_1 \cdot P_2(s+2 \cdot \zeta \cdot \omega n)/(s^2+2 \cdot \zeta \cdot \omega n \cdot s+\omega n^2)d\delta/dt+I \cdot (s+2 \cdot \zeta \cdot \omega n)/(s^2+2 \cdot \zeta \cdot \omega n \cdot s+\omega n^2) \cdot f(V) \cdot \delta + \text{damping component for correction} = \text{damping component} \cdot P_1 \cdot P_2 + \text{proportional component} + \text{damping component for correction} \quad (5)$$

Note that the damping component is $P(s+2 \cdot \zeta \cdot \omega n)/(s^2+2 \cdot \zeta \cdot \omega n \cdot s+\omega n^2)d\delta/dt$, and the proportional component is $I \cdot (s+2 \cdot \zeta \cdot \omega n)/(s^2+2 \cdot \zeta \cdot \omega n \cdot s+\omega n^2) \cdot f(V) \cdot \delta$. Moreover, the damping component for correction is a damping component that is based on the steering angular velocity dδ/dt, and generates the steering reaction force in an opposite direction to that of the steering angular velocity dδ/dt.

Figure 7:
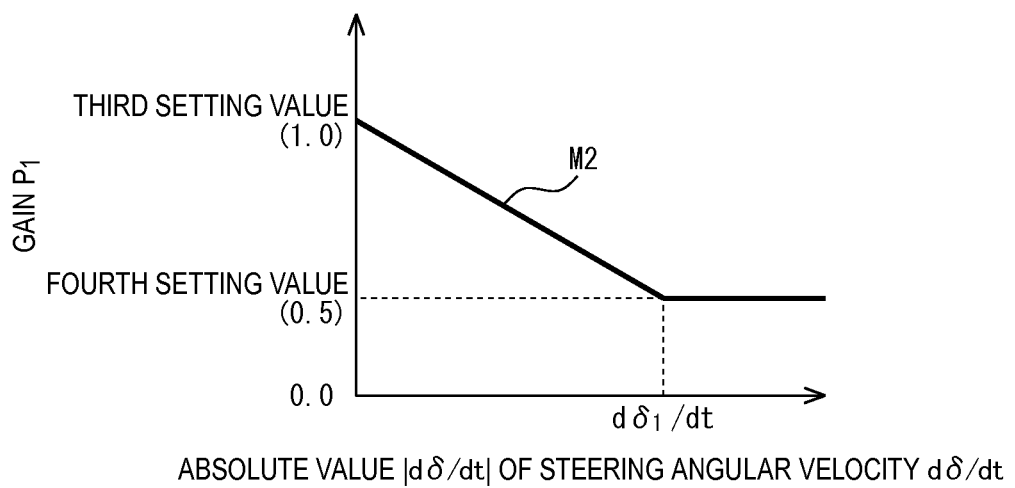
FIG. 7 is a graph illustrating a control map M2.

FIG. 7 is a graph illustrating a control map M2. Here, as a method for setting the gain $P_1$, for example, there can be employed a method of reading a gain $P_1$, which corresponds to an absolute value of the steering angular velocity dδ/dt, from the control map M2. As the control map M2, for example, there is a map in which the gain $P_1$ corresponding to the absolute value of the steering angular velocity dδ/dt is registered. Specifically, as illustrated in FIG. 7, the control map M2 sets the gain $P_1$ to a third setting value (for example, 1.0) in a case where the steering angular velocity dδ/dt is 0. Moreover, in a range where the absolute value of the steering angular velocity dδ/dt is a first setting steering angular velocity $d\delta_1/dt$ (>0) or more, the gain $P_1$ is set to a fourth setting value (<third setting value; for example, 0.5) irrespective of a magnitude of the steering angular velocity dδ/dt. Furthermore, in a range where the absolute value of the steering angular velocity dδ/dt is 0 or more and less than the first setting steering angular velocity $d\delta_1/dt$, the control map M2 linearly decreases the gain $P_1$ in response to the absolute value of the steering angular velocity dδ/dt. Specifically, in the range where the absolute value of the steering angular velocity dδ/dt is 0 or more and less than the first setting steering angular velocity $d\delta_1/dt$, the control map M2 sets the gain $P_1$ in accordance with a linear function representing a relationship between the absolute value of the steering angular velocity dδ/dt and the gain $P_1$. In the linear function, the gain $P_1$ is set to a third setting value (1.0) in a case where the steering angular velocity dδ/dt is 0, and the gain $P_1$ is set to a fourth setting value (0.5) in a case where the absolute value of the steering angular velocity dδ/dt is the first setting steering angular velocity $d\delta_1/dt$. In such a way, in a case where the absolute value of the steering angular velocity dδ/dt is less than the first setting steering angular velocity $d\delta_1/dt$, the feedforward axial force calculating unit 11Ba decreases (corrects) an absolute value of the damping component as the absolute value of the steering angular velocity dδ/dt is larger. Meanwhile, in a case where the absolute value of the steering angular velocity dδ/dt is the first setting steering angular velocity $d\delta_1/dt$ or more, the feedforward axial force calculating unit 11Ba does not correct the absolute value of the damping component based on the gain $P_1$ irrespective of the magnitude of the steering angular velocity dδ/dt.

Figure 8:
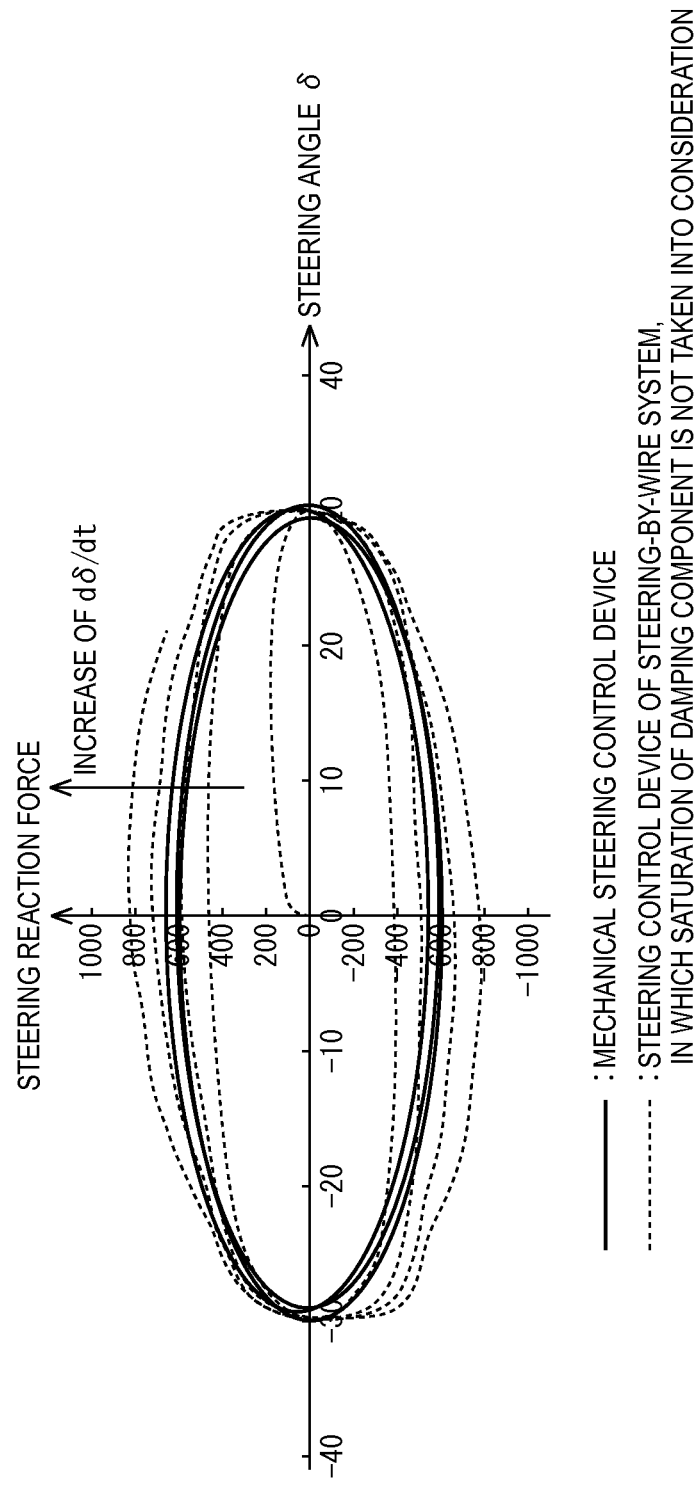
FIG. 8 is a graph illustrating a relationship between a steering angle δ and steering reaction force.

FIG. 8 is a graph illustrating a relationship between the steering angle δ and the steering reaction force. This graph is illustrated for each steering control device (for each mechanical steering control device in which the steering wheel 1 and the steered wheels 2 are mechanically coupled to each other, and for each steering control device of the Steer By Wire system, in which saturation of the damping component is not taken into consideration). In the mechanical steering control device, as the steering angular velocity $d\delta/dt$ is increased, the damping component contained in the steering reaction force is saturated. Therefore, in the mechanical steering control device, as illustrated in FIG. 8, the damping component is saturated, whereby a shape of a Lissajous's figure composed of the steering angle $\delta$ and the steering reaction force becomes constant irrespective of the magnitude of the steering angular velocity $d\delta/dt$. However, in the steering control device of the Steer By Wire system, in which the saturation of the damping component included in the steering reaction force is not taken into consideration, the steering reaction force continues to be increased in response to the increase of the steering angular velocity $d\delta/dt$. In contrast, the control computing unit 11 in one embodiment of the present disclosure decreases the absolute value of the damping component as the absolute value of the steering angular velocity $d\delta/dt$ is larger. Therefore, the control computing unit 11 in one embodiment of the present disclosure can suppress an increase of the absolute value of the damping component in the case where the steering angular velocity $d\delta/dt$ is large. Accordingly, the control computing unit 11 in one embodiment of the present disclosure can suppress the damping component from becoming excessive. In such a way, the control computing unit 11 in one embodiment of the present disclosure can impart a more appropriate steering feeling.

Figure 9:
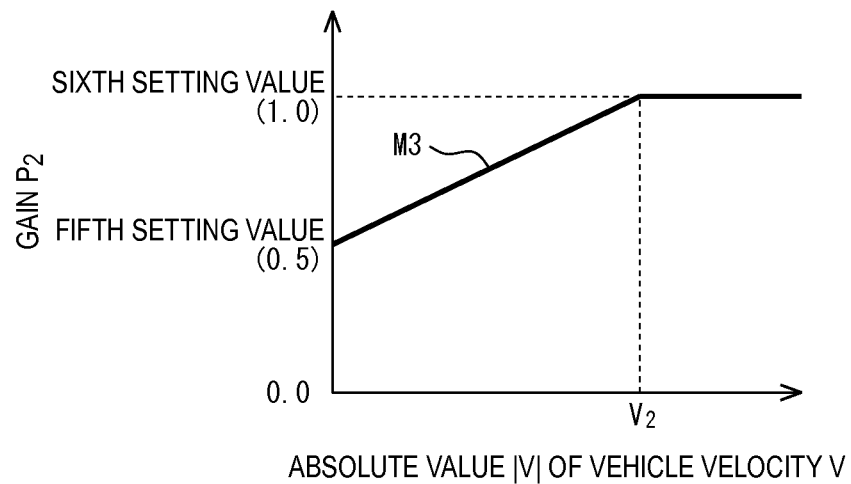
FIG. 9 is a graph illustrating a control map M3.

FIG. 9 is a graph illustrating a control map M3. Moreover, as a method for setting the gain $P_2$, for example, there can be employed a method of reading a gain $P_2$, which corresponds to an absolute value of the vehicle velocity V, from the control map M3. As the control map M3, for example, there is a map in which the gain $P_2$ corresponding to the absolute value of the vehicle velocity V is registered. Specifically, as illustrated in FIG. 9, the control map M3 sets the gain $P_2$ to a fifth setting value (for example, 0.5) in a case where the absolute value of the vehicle velocity V is 0. Moreover, in a range where the absolute value of the vehicle velocity V is a second setting vehicle velocity $V_2$ (>0) or more, the gain $P_2$ is set to a sixth setting value (>fifth setting value; for example, 1.0) irrespective of the magnitude of the vehicle velocity V. Furthermore, in a range where the absolute value of the vehicle velocity V is 0 or more and less than the second setting vehicle velocity $V_2$, the control map M3 linearly increases the gain $P_2$ in response to the absolute value of the vehicle velocity V. Specifically, in the range where the absolute value of the vehicle velocity V is 0 or more and less than the second setting vehicle velocity $V_2$, the control map M3 sets the gain $P_2$ in accordance with a linear function representing a relationship between the absolute value of the vehicle velocity V and the gain $P_2$. In the linear function, the gain $P_2$ is set to the fifth setting value (0.5) in the case where the absolute value of the vehicle velocity V is 0, and the gain $P_2$ is set to the sixth setting value (1.0) in the case where the absolute value of the vehicle velocity V is the second setting vehicle velocity $V_2$. In such a way, in a case where the absolute value of the vehicle velocity V is less than the second setting vehicle velocity $V_2$, the feedforward axial force calculating unit 11Ba decreases (corrects) the absolute value of the damping component as the absolute value of the vehicle velocity V is smaller. Meanwhile, in a case where the absolute value of the vehicle velocity V is the second setting vehicle velocity $V_2$ or more, the feedforward axial force calculating unit 11Ba does not correct the absolute value of the damping component based on the gain $P_2$ irrespective of the magnitude of the vehicle velocity V.

As described above, the control computing unit 11 in one embodiment of the present disclosure decreases the absolute value of the damping component as the absolute value of the vehicle velocity V is smaller. Here, in the mechanical steering control device in which the steering wheel 1 and the steered wheels 2 are mechanically coupled to each other, when the vehicle velocity V is decreased, then the tire lateral force Fd of the steered wheels 2 is decreased, and the steering reaction force is decreased. For this, the control computing unit 11 in one embodiment of the present disclosure decreases the absolute value of the damping component as the absolute value of the vehicle velocity V is smaller, and can thereby reduce the steering reaction force. In such a way, the control computing unit 11 in one embodiment of the present disclosure can impart the more appropriate steering feeling.

Figure 10:
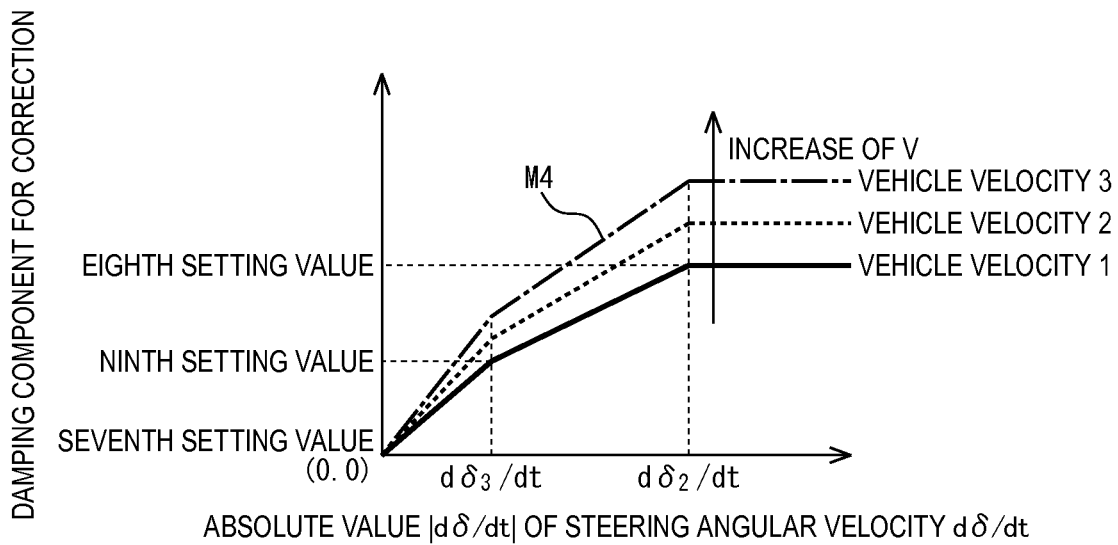
FIG. 10 is a graph illustrating a control map M4.

FIG. 10 is a graph illustrating a control map M4. Moreover, as a method for setting the damping component for correction, for example, there can be employed a method of reading a damping component for correction, which corresponds to the absolute value of the steering angular velocity $d\delta/dt$, from the control map M4. As the control map M2, for example, there is a map in which the damping component for correction, which corresponds to the absolute value of the steering angular velocity $d\delta/dt$, is registered. Specifically, as illustrated in FIG. 10, the control map M4 is set for each vehicle velocity V. Each control map M4 sets the damping component for correction to a seventh setting value (for example, 0.0) in the case where the steering angular velocity $d\delta/dt$ is 0. Moreover, in a range where the absolute value of the steering angular velocity $d\delta/dt$ is a second setting steering angular velocity $d\delta_2/dt$ (>0) or more, the control map M4 sets the damping component for correction to an eighth setting value (constant value) irrespective of the magnitude of the steering angular velocity $d\delta/dt$. Furthermore, in a range where the steering angular velocity $d\delta/dt$ is 0.0 or more and the absolute value of the steering angular velocity $d\delta/dt$ is less than a third setting steering angular velocity $d\delta_3/dt$ ($0<d\delta_3/dt<d\delta_2/dt$), the control map M4 linearly increases the damping component for correction in response to the absolute value of the steering angular velocity $d\delta/dt$. Specifically, in the range where the absolute value of the steering angular velocity $d\delta/dt$ is 0 or more and less than the third setting steering angular velocity $d\delta_3/dt$, each control map M4 sets the damping component for correction in accordance with a linear function representing a relationship between the absolute value of the steering angular velocity $d\delta/dt$ and the damping component for correction. In the linear function, in the case where the absolute value of the steering angular velocity $d\delta/dt$ is 0, the damping component for correction is set to the seventh setting value (0.0), and in the case where the absolute value of the steering angular velocity $d\delta/dt$ is the third setting steering angular velocity $d\delta_3/dt$, the damping component for correction is set to a ninth setting value (0<ninth setting value<eighth setting value). Moreover, in a range where the absolute value of the steering angular velocity $d\delta/dt$ is the third setting steering angular velocity $d\delta_3/dt$ or more and less than the second setting steering angular velocity $d\delta_2/dt$, each control map M4 linearly increases the damping component for correction in response to the absolute value of the steering angular velocity $d\delta/dt$. Specifically, in the range where the absolute value of the steering angular velocity $d\delta/dt$ is the third setting steering angular velocity $d\delta_3/dt$ or more and less than the second setting steering angular velocity $d\delta_2/dt$, the control map M4 sets the damping component for correction in accordance with a linear function representing a relationship between the absolute value of the vehicle velocity V and the damping component for correction. In the linear function, the damping component for correction is set to the ninth setting value in the case where the absolute value of the steering angular velocity dδ/dt is the third setting steering angular velocity dδ$_3$/dt, and the damping component for correction is set to the eighth setting value in the case where the absolute value of the steering angular velocity dδ/dt is the second setting steering angular velocity dδ$_2$/dt. In such a way, in a case where the absolute value of the steering angular velocity dδ/dt is less than the second setting steering angular velocity dδ$_2$/dt, the feedforward axial force calculating unit 11Ba increases the absolute value of the damping component for correction as the absolute value of the steering angular velocity dδ/dt is larger. Meanwhile, in a case where the absolute value of the steering angular velocity dδ/dt is the second setting steering angular velocity dδ$_2$/dt or more, the feedforward axial force calculating unit 11Ba sets the absolute value of the damping component for correction to a preset constant value irrespective of the magnitude of the steering angular velocity dδ/dt.

As described above, the control computing unit 11 in one embodiment of the present disclosure adds the damping component for correction, in which the absolute value becomes larger as the absolute value of the steering angular velocity dδ/dt is larger, to the feedforward axial force $T_{FF}$. Therefore, in the case where the absolute value of the steering angular velocity dδ/dt is increased when the steering wheel 1 is started to be steered, the control computing unit 11 in one embodiment of the present disclosure can increase a rise of the steering reaction force. In such a way, the control computing unit 11 in one embodiment of the present disclosure can impart the more appropriate steering feeling.

Moreover, in a case where the absolute value of the steering angular velocity dδ/dt is the second setting steering angular velocity dδ$_2$/dt or more, the control computing unit 11 in one embodiment of the present disclosure sets a preset constant value to the damping component for correction. Therefore, in a case where the absolute value of the steering angular velocity dδ/dt is the second setting steering angular velocity dδ$_2$/dt or more by the fact that a driver steers the steering wheel 1, variations of the damping component for correction can be suppressed. Accordingly, the control computing unit 11 in one embodiment of the present disclosure can prevent a feeling of wrongness in the steering feeling from being given to the driver by the fact that the change of the steering reaction force, which is caused by the variations of the damping component for correction, is not sensed.

Figure 11:
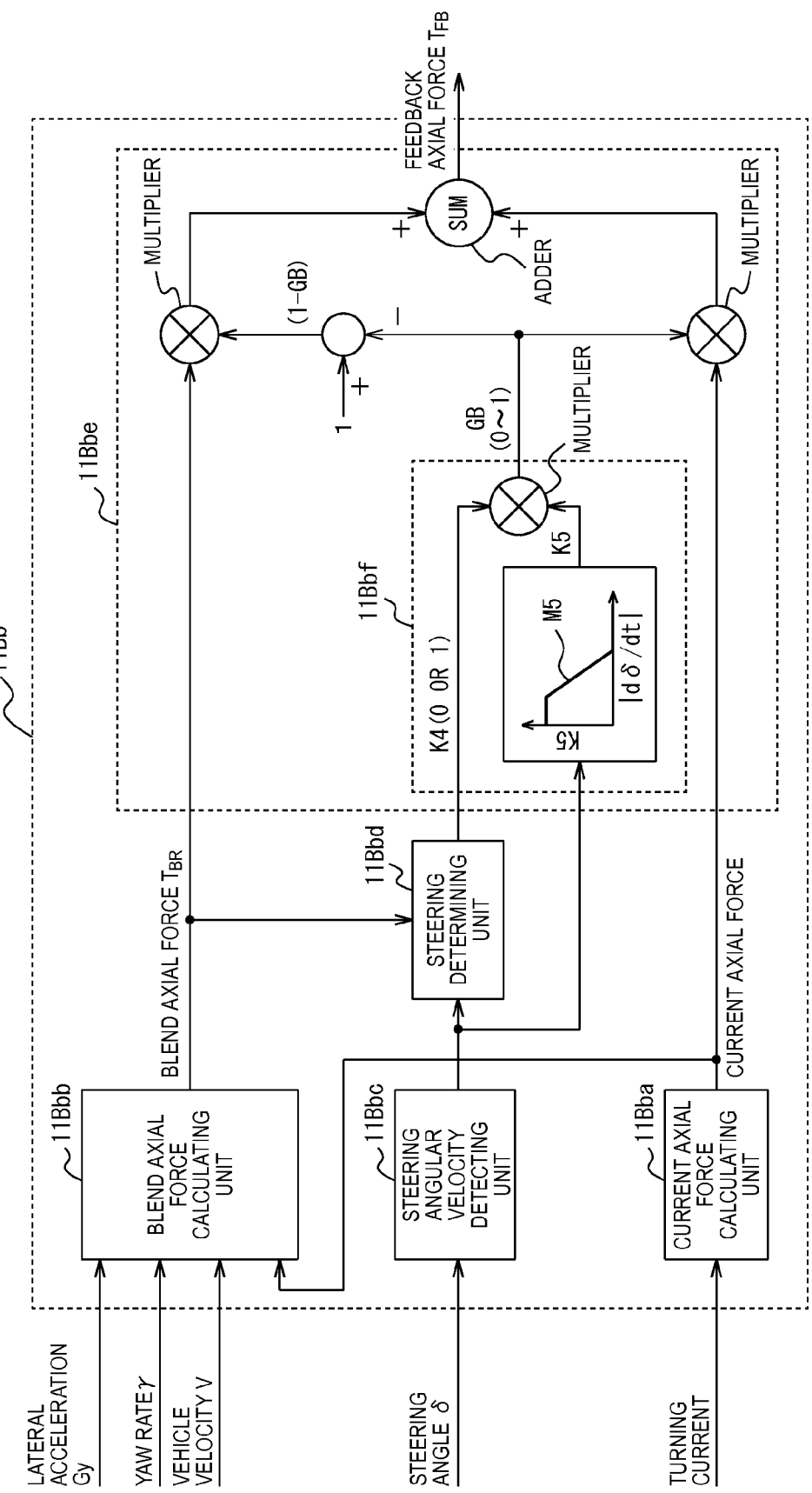
FIG. 11 is a block diagram illustrating a configuration of a feedback axial force calculating unit 11Bb.

FIG. 11 is a block diagram illustrating a configuration of the feedback axial force calculating unit 11Bb. As shown in FIG. 11, the feedback axial force calculating unit 11Bb includes a current axial force calculating unit 11Bba, a blend axial force calculating unit 11Bbb, a steering angular velocity detecting unit 11Bbc, a steering determining unit 11Bbd, and a feedback axial force calculation executing unit 11Bbe.

Based on the turning current detected by the turning current detecting unit 8B, the current axial force calculating unit 11Bba calculates steering rack axial force (axial force of the steering rack; hereinafter, referred to as current axial force) in accordance with a following formula (6). In the formula (6), first, the turning current, a torque constant (Nm/A) for calculating output torque of the turning motor 8A based on the turning current, and a motor gear ratio for transmitting motor torque of the turning motor 8A are multiplied with one another. Subsequently, in the formula (6), a result of the multiplication is divided by a pinion radius (m) of a pinion gear of the turning motor 8A, a result of the division is multiplied by efficiency in an event where the output torque of the turning motor 8A is transmitted, and a result of the multiplication is calculated as the current axial force. Then, the current axial force calculating unit 11Bba outputs a result of the calculation to the blend axial force calculating unit 11Bbb and the feedback axial force calculation executing unit 11Bbe.

$$\text{Current axial force} = (\text{turning current} \times \text{motor gear ratio} \times \text{torque constant [Nm/A]}/\text{pinion radius [m]}) \times \text{efficiency} \quad (6)$$

Figure 12:
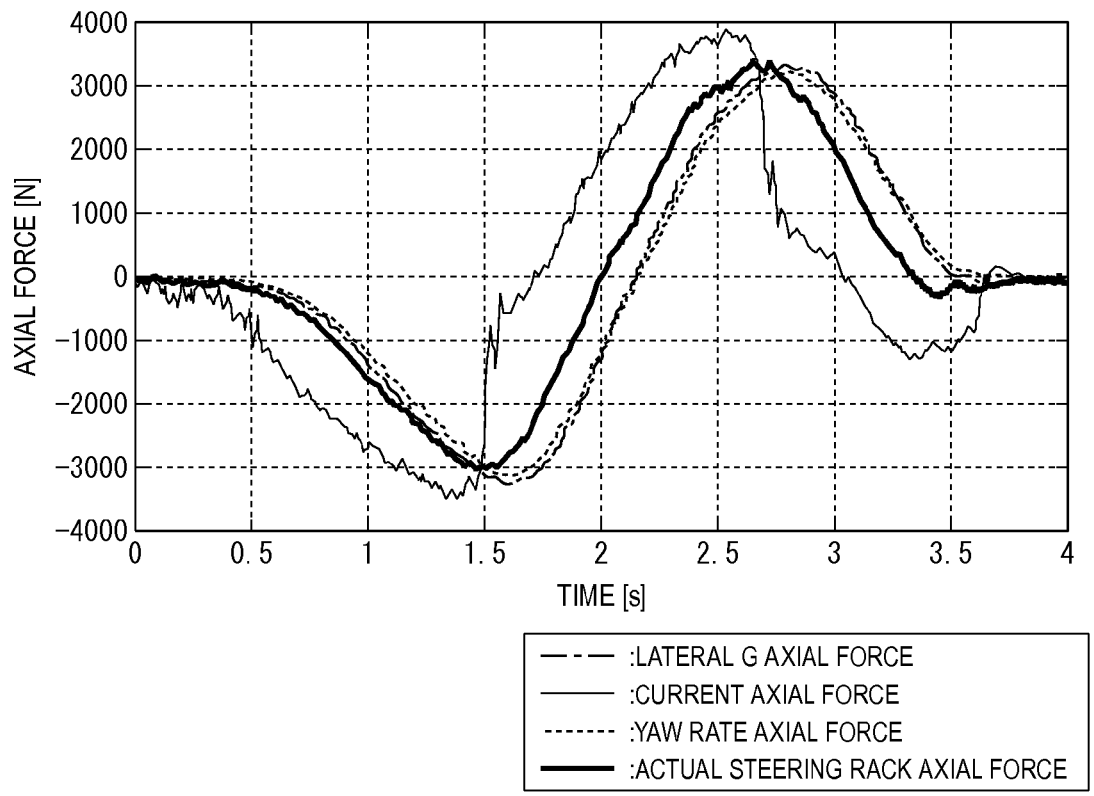
FIG. 12 is a graph illustrating lateral G axial force, current axial force, yaw rate axial force, and actual steering rack axial force.

Here, the turning current varies by the fact that the steering wheel 1 is steered, that the target turning angle θ* changes, and that a difference is caused between the target turning angle θ* and the actual turning angle θ. Moreover, the turning current also varies by the fact that the steered wheels 2 are applied, that the tire lateral force Fd acts on the steered wheels 2, and that difference is caused between the target turning angle θ* and the actual turning angle θ. Furthermore, the turning current also varies by the fact that road surface disturbance acts on the steered wheels 2 due to road surface irregularities or the like, that the tire lateral force Fd acts on the steered wheels 2, and that a difference is caused between the target turning angle θ* and the actual turning angle θ. Therefore, based on the turning current, the feedback axial force calculating unit 11Bb can calculate steering rack axial force (current axial force) reflecting an influence of the tire lateral force Fd acting on the steered wheels 2. Here, the current axial force is generated at a point of time when a difference is caused between the target turning angle θ* and the actual turning angle θ. Therefore, as illustrated in FIG. 12, a phase of the current axial force becomes earlier than that of the actual steering rack axial force or the actual lateral G axial force.

Based on the lateral acceleration Gy detected by the lateral G sensor 6, the blend axial force calculating unit 11Bbb calculates steering rack axial force (hereinafter, also referred to as lateral G axial force) in accordance with a following formula (7). In the following formula (7), first, a front wheel load and the lateral acceleration Gy are multiplied with each other, and a result of the multiplication is calculated as axial force (force in the axis direction) applied to the steered wheels 2. Subsequently, in the following formula (7), the calculated axial force applied to the steered wheels 2 and a constant (hereinafter, also referred to as a link ratio) corresponding to an angle of a link and to a suspension are multiplied with each other, and a result of the multiplication is calculated as the lateral G axial force.

$$\text{Lateral } G \text{ axial force} = \text{axial force applied to steered wheels 2} \times \text{link ratio} \quad (7)$$

$$\text{Axial force applied to steered wheels 2} = \text{front wheel load} \times \text{lateral acceleration } Gy$$

Here, the lateral acceleration Gy is generated by the fact that the steered wheels 2 are turned, that the tire lateral force Fd acts on the steered wheels 2, and that the vehicle A makes a turn. Therefore, based on the lateral acceleration Gy, the blend axial force calculating unit 11Bbb can calculate the steering rack axial force (lateral G axial force) reflecting the influence of the tire lateral force Fd acting on the steered wheels 2. Here, since the lateral G sensor 6 is disposed in the sprung body (vehicle body), the detection of the lateral acceleration Gy delays. Accordingly, as illustrated in FIG. 12, the phase of the lateral G axial force is later than that of the actual steering rack axial force.

Note that, in one embodiment of the present disclosure, an example is illustrated, where the lateral acceleration Gy detected by the lateral G sensor 6 is used in the event of calculating the lateral G axial force; however, other configurations may be adopted. For example, such a configuration may be adopted, in which the yaw rate γ detected by the yaw rate sensor 7 is multiplied by the vehicle velocity V detected by the vehicle velocity sensor 5, and a result γ×V of the multiplication is used in place of the lateral acceleration Gy.

Moreover, based on the vehicle velocity V detected by the vehicle velocity sensor 5, and on the yaw rate γ detected by the yaw rate sensor 7, the blend axial force calculating unit 11Bbb calculates steering rack axial force (hereinafter, also referred to as yaw rate axial force) in accordance with a following formula (8). In the following formula (8), first, the front wheel load, the vehicle velocity V and the yaw rate γ are multiplied with one another, and a result of the multiplication is calculated as the axial force applied to the steered wheels 2. Subsequently, in the following formula (8), the calculated axial force applied to the steered wheels 2 and the link ratio are multiplied with each other, and a result of the multiplication is calculated as the yaw rate axial force.

Yaw rate axial force=axial force applied to steered wheels 2×link ratio (8)

Axial force applied to steered wheels 2=front wheel load×vehicle velocity V×yaw rate γ

Here, the yaw rate γ is generated by the fact that the steered wheels 2 are turned, that the tire lateral force Fd acts on the steered wheels 2, and that the vehicle A makes a turn. Therefore, based on the yaw rate γ, the blend axial force calculating unit 11Bbb can calculate the steering rack axial force (yaw rate axial force) reflecting the influence of the tire lateral force Fd acting on the steered wheels 2. Here, since the yaw rate sensor 7 is disposed in the sprung body (vehicle body), the detection of the yaw rate γ delays. Accordingly, as illustrated FIG. 12, the phase of the yaw rate axial force is later than that of the actual steering rack axial force.

Moreover, the blend axial force calculating unit 11Bbb reads the current axial force from the current axial force calculating unit 11Bba. Subsequently, based on the read current axial force and on the calculated lateral G axial force and yaw rate axial force, the blend axial force calculating unit 11Bbb calculates steering rack axial force (hereinafter, also referred to as "blend axial force") $T_{BR}$ in accordance with a following formula (9). In the following formula (9), the lateral G axial force is multiplied by an allocation ratio K1, the current axial force is multiplied by an allocation ratio K2, the yaw rate axial force is multiplied by an allocation ratio K3, and a sum of results of the multiplications is calculated as the blend axial force $T_{BR}$. That is to say, the blend axial force $T_{BR}$ is calculated based on a value obtained by multiplying the lateral G axial force by the allocation ratio K1, on a value obtained by multiplying the current axial force by the allocation ratio K2, and on a value obtained by multiplying the yaw rate axial force by the allocation ratio K3. Then, the blend axial force calculating unit 11Bbb outputs a result of the calculation to the steering determining unit 11Bbd and the feedback axial force calculation executing unit 11Bbe. Here, in the blend axial force $T_{BR}$, axial force that directs the steered wheels 2 in the right direction is defined to be positive, and axial force that directs the steered wheels 2 in the left direction is defined to be negative.

$T_{BR}$=lateral G axial force×K1+current axial force× K2+yaw rate axial force×K3 (9)

Here, the allocation ratios K1, K2 and K3 are allocation ratios of the lateral G axial force, the current axial force and the yaw rate axial force, respectively. A magnitude relationship among the allocation ratios K1, K2 and K3 is set to K1>K2>K3. That is to say, the allocation ratios are set to be larger in the order of the lateral G axial force, the current axial force and the yaw rate axial force. For example, the allocation ratios K1, K2 and K3 are individually set as: K1=0.6; K2=0.3; and K3=0.1. In such a way, the blend axial force calculating unit 11Bbb calculates, as the blend axial force $T_{BR}$, the steering rack axial force reflecting the influence of the tire lateral force Fd acting on the steered wheels 2.

Figure 13:
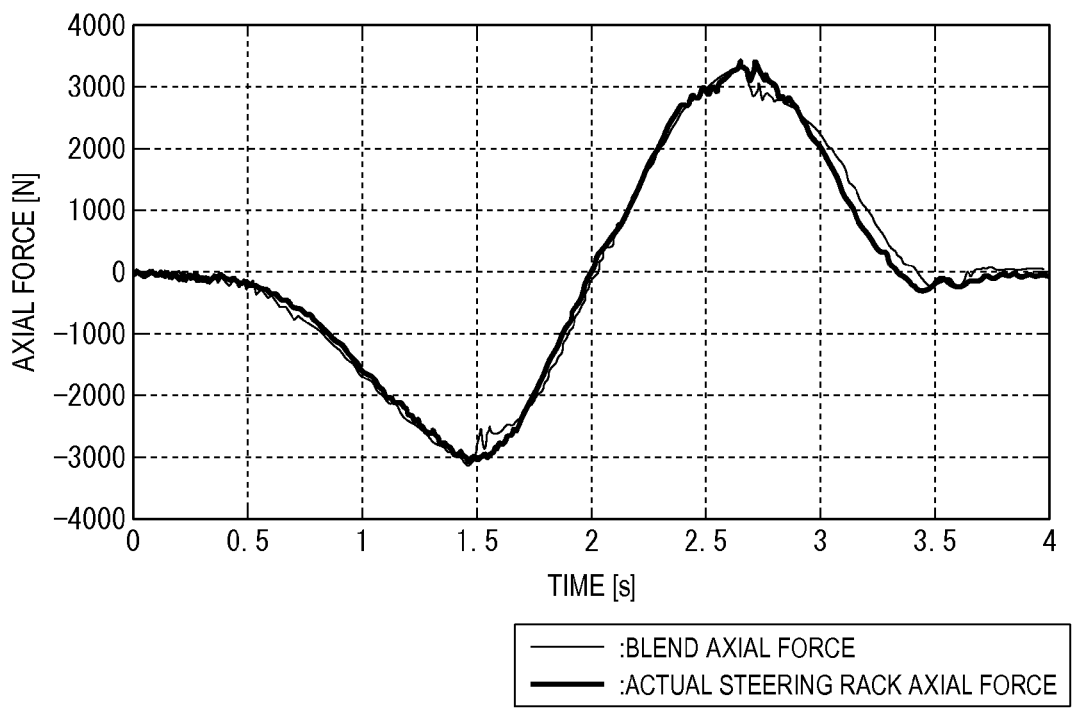
FIG. 13 is a graph illustrating blend axial force $T_{BR}$ and the actual steering rack axial force.

FIG. 13 is a graph illustrating the blend axial force $T_{BR}$ and the actual steering rack axial force. As described above, the blend axial force calculating unit 11Bbb in one embodiment of the present disclosure calculates the blend axial force $T_{BR}$ based on the value obtained by multiplying the current axial force by the allocation ratio K2 and on the value obtained by multiplying the lateral G axial force by the allocation ratio K1. Here, as illustrated in FIG. 12, the phase of the lateral G axial force is later than that of the actual steering rack axial force. Moreover, the phase of the current axial force is earlier than that of the actual steering rack axial force. Therefore, the blend axial force calculating unit 11Bbb in one embodiment of the present disclosure adds the current axial force to the lateral G axial force, and thereby, as illustrated in FIG. 13, can compensate for the phase delay due to the lateral G axial force, and can calculate more appropriate blend axial force $T_{BR}$. Accordingly, the control computing unit 11 in one embodiment of the present disclosure can apply more appropriate steering reaction force by driving the reaction force motor 9A based on the blend axial force $T_{BR}$.

Moreover, the blend axial force calculating unit 11Bbb in one embodiment of the present disclosure calculates the blend axial force $T_{BR}$ based on the value obtained by multiplying the current axial force by the allocation ratio K2 and on the value obtained by multiplying the lateral G axial force by the allocation ratio K1. Here, in a case where, due to the road surface irregularities or the like, the road surface disturbance acts on the steered wheels 2, and the tire lateral force Fd acts on the steered wheels 2, then a difference occurs between the target turning angle θ* and the actual turning angle θ in the vehicle A. Therefore, the blend axial force calculating unit 11Bbb in one embodiment of the present disclosure adds the current axial force to the lateral G axial force, and can thereby reflect the influence of the road surface disturbance, which acts on the steered wheels 2, on the blend axial force $T_{BR}$, and can calculate more appropriate blend axial force $T_{BR}$. Accordingly, the control computing unit 11 in one embodiment of the present disclosure can apply more appropriate steering reaction force by driving the reaction force motor 9A based on the blend axial force $T_{BR}$.

Moreover, the blend axial force calculating unit 11Bbb in one embodiment of the present disclosure sets the allocation ratio K1 of the lateral G axial force to be larger than the allocation ratio K2 of the current axial force. Therefore, the blend axial force calculating unit 11Bbb in one embodiment of the present disclosure can reduce the allocation ratio of the current axial force, and can suppress a decrease of estimation accuracy for the blend axial force $T_{BR}$, for example, even if the estimation accuracy for the current axial force is lowered due to an influence of inertia and friction of the turning motor 8A. Accordingly, the control computing unit 11 in one embodiment of the present disclosure can apply more appropriate steering reaction force by driving the reaction force motor 9A based on the blend axial force $T_{BR}$.

Moreover, the blend axial force calculating unit 11Bbb in one embodiment of the present disclosure calculates the feedback axial force $T_{FB}$ based on the value obtained by multiplying the current axial force by the allocation ratio K2, on the value obtained by multiplying the lateral G axial force by the allocation ratio K1, and on the value obtained by multiplying the yaw rate axial force by the allocation ratio K3. Here, for example, in a case where the vehicle A turns to a spin state, the turning current and the lateral acceleration Gy are increased, and accordingly, both of a detection result of the lateral G sensor 6 and a detection result of the turning current detecting unit 8B reach maximum values (saturated values). In contrast, the yaw rate γ is also increased; however, since an amount of the increase of the yaw rate γ is relatively smaller than amounts of increase of the turning current and the lateral acceleration Gy, and accordingly, a detection result of the yaw rate sensor 7 does not reach a maximum value (saturated value). Accordingly, the detection result of the yaw rate sensor 7 varies depending on a degree of the spin state of the vehicle A. Therefore, the blend axial force $T_{BR}$ can be varied in response to the degree of the spin state of the vehicle A. As a result, the control computing unit 11 in one embodiment of the present disclosure can apply more appropriate steering reaction force by driving the reaction force motor 9A based on the blend axial force $T_{BR}$.

The steering angular velocity detecting unit 11Bbc calculates the steering angular velocity dδ/dt of the steering wheel 1 based on the steering angle δ detected by the steering angle sensor 3. Then, the steering angular velocity detecting unit 11Bbc outputs a result of the calculation to the blend axial force calculating unit 11Bbb and the steering determining unit 11Bbd. Here, in the steering angular velocity dδ/dt, an angular velocity in a case where the steering wheel 1 rotates clockwise is defined to be positive, and an angular velocity in a case where the steering wheel 1 rotates counterclockwise is defined to be negative.

Based on the blend axial force $T_{BR}$ calculated by the blend axial force calculating unit 11Bbb and on the steering angular velocity dδ/dt detected by the steering angular velocity detecting unit 11Bbc, the steering determining unit 11Bbd determines which of a steering increasing operation and a steering returning operation the driver is performing. For example, the steering increasing operation is a steering operation in a direction where the steering wheel 1 (steering angle δ) leaves a neutral position. Moreover, for example, the steering returning operation is a steering operation in a direction where the steering wheel 1 (steering angle δ) approaches the neutral position. Specifically, in a case where the blend axial force $T_{BR}$ is positive and the steering angular velocity dδ/dt is positive, or in a case where the blend axial force $T_{BR}$ is negative and the steering angular velocity dδ/dt is negative, the steering determining unit 11Bbd determines that the steering increasing operation of the steering wheel 1 is performed, and sets a variable K4 to 1.0. The variable K4 is a flag indicating that either of the steering increasing operation and the steering returning operation of the steering wheel 1 is performed. The variable K4 is set to 1.0 in a case where the steering increasing operation of the steering wheel 1 is performed, and is set to 0.0 in a case where the steering returning operation of the steering wheel 1 is performed. Moreover, in a case where the blend axial force $T_{BR}$ is positive and the steering angular velocity dδ/dt is negative, or in a case where the blend axial force $T_{BR}$ is negative and the steering angular velocity dδ/dt is positive, the steering determining unit 11Bbd determines that the steering increasing operation of the steering wheel 1 is not performed, and sets the variable K4 to 0. Then, the steering determining unit 11Bbd outputs the set variable K4 to the feedback axial force calculation executing unit 11Bbe.

The feedback axial force calculation executing unit 11Bbe reads the current axial force, the blend axial force $T_{BR}$, the steering angular velocity dδ/dt and the variable K4 from the current axial force calculating unit 11Bba, the blend axial force calculating unit 11Bbb, the steering angular velocity detecting unit 11Bbc and the steering determining unit 11Bbd, respectively. Subsequently, based on the current axial force, the blend axial force $T_{BR}$, the steering angular velocity dδ/dt and the variable K4, which are thus read, the feedback axial force calculation executing unit 11Bbe calculates steering rack axial force (hereinafter, feedback axial force $T_{FB}$) in accordance with a following formula (10). Then, the feedback axial force calculation executing unit 11Bbe outputs a result of the calculation to the final axial force calculating unit 11Bc.

Feedback axial force $T_{FB}$=current axial force×GB+ blend axial force $T_{BR}$×(1−GB)     (10)

Note that GB is a numeric value representing an allocation ratio GB of the current axial force and an allocation ratio (1−GB) of the blend axial force $T_{BR}$ (hereinafter, this numeric value is referred to as an allocation ratio). In such a way, based on the allocation ratio GB, the feedback axial force calculation executing unit 11Bbe adds the current axial force and the blend axial force $T_{BR}$ to each other in a ratio of GB:(1−GB), and calculates the feedback axial force $T_{FB}$.

Here, as a method for setting the allocation ratio GB, for example, there can be employed a method of setting the allocation ratio GB by an allocation ratio setting unit 11Bbf based on such a determination result outputted by the steering determining unit 11Bbd. The allocation ratio setting unit 11Bbf reads the steering angular velocity dδ/dt and the variable K4 from the steering determining unit 11Bbd. Subsequently, based on the read steering angular velocity dδ/dt and variable K4, the allocation ratio setting unit 11Bbf calculates the allocation ratio GB in accordance with a following formula (11).

$$GB=K4 \times K5 \quad (11)$$

Note that K5 is a numeric value representing the allocation ratio GB of the current axial force and the allocation ratio (1−GB) of the blend axial force $T_{BR}$ when K4 is 1.0, that is, at the time of the steering increasing operation of the steering wheel 1. In such a way, at the time of the steering increasing operation of the steering wheel 1, the feedback axial force calculation executing unit 11Bbe adds the current axial force and the blend axial force $T_{BR}$ to each other in a ratio of K5:(1−K5) based on the variable K5, and calculates the feedback axial force $T_{FB}$. Note that, when K4 is 0.0, that is, at the time of the steering returning operation of the steering wheel 1, the blend axial force $T_{BR}$ is set to be the feedback axial force $T_{FB}$ irrespective of the variable K5.

Here, as a method for setting the variable K5, for example, there can be employed a method of reading a variable K5, which corresponds to the steering angular velocity dδ/dt, from the control map M5. As the control map M5, for example, there is a map in which the variable K5 corresponding to the steering angular velocity dδ/dt is registered.

Figure 14:
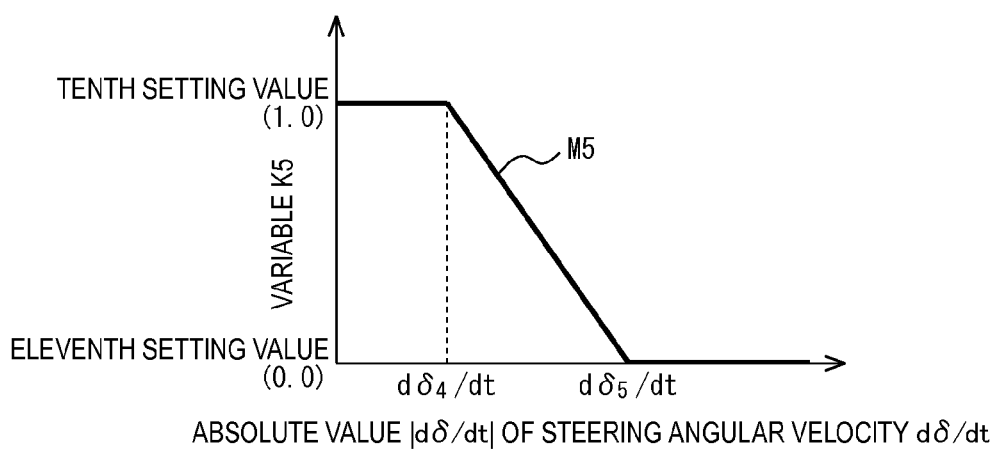
FIG. 14 is a graph illustrating a control map M5.

FIG. 14 is a graph illustrating a control map M5. As illustrated in FIG. 14, in a range where the absolute value of the steering angular velocity dδ/dt is 0 or more and less than a fourth setting steering angular velocity $d\delta_4/dt$ (>0), the control map M5 sets the variable K5 to a tenth setting value (for example, 1.0) irrespective of the magnitude of the steering angular velocity dδ/dt. Moreover, in a range where the absolute value of the steering angular velocity dδ/dt is a fifth setting steering angular velocity $d\delta_5/dt$ (>$d\delta_4/dt$) or more, the control map M5 sets the variable K5 to an eleventh setting value (<tenth setting value; for example, 0.0) irrespective of the magnitude of the steering angular velocity dδ/dt. Furthermore, in a range where the absolute value of the steering angular velocity dδ/dt is the fourth setting steering angular velocity dδ$_4$/dt or more and less than the fifth setting steering angular velocity dδ$_5$/dt, the control map M5 linearly decreases the variable K5 in response to the absolute value of the steering angular velocity dδ/dt. Specifically, in the range where the absolute value of the steering angular velocity dδ/dt is the fourth setting steering angular velocity dδ$_4$/dt or more and less than the fifth setting steering angular velocity dδ$_5$/dt, the control map M5 sets the variable K5 in accordance with a linear function representing a relationship between the absolute value of the steering angular velocity dδ/dt and the variable K5. In the linear function, the variable K5 is set to a tenth setting value (1.0) in a case where the absolute value of the steering angular velocity dδ/dt is the fourth setting steering angular velocity dδ$_4$/dt, and the variable K5 is set to an eleventh setting value (0.0) in a case where the absolute value of the steering angular velocity dδ/dt is the fifth setting steering angular velocity dδ$_5$/dt. In such a way, the allocation ratio setting unit 11Bbf sets the allocation ratio GB to 1.0 in a case where the variable K4 is 1.0 (time of the steering increasing operation) and the absolute value of the steering angular velocity dδ/dt is less than the fourth setting steering angular velocity dδ$_4$/dt (time of low-velocity steering). Then, the feedback axial force calculation executing unit 11Bbe sets the current axial force to the feedback axial force T$_{FB}$. Moreover, the allocation ratio setting unit 11Bbf sets the allocation ratio GB to 0.0 In a case where the variable K4 is 1.0 (time of the steering increasing operation) and the absolute value of the steering angular velocity dδ/dt is the fifth setting steering angular velocity dδ$_5$/dt or more (time of high-velocity steering). In such a way, the feedback axial force calculation executing unit 11Bbe sets the blend axial force T$_{BR}$ to the feedback axial force T$_{FB}$. Moreover, the allocation ratio setting unit 11Bbf sets the variable K5 to the allocation ratio GB in a case where the variable K4 is 1.0 (time of the steering increasing operation) and the absolute value of the steering angular velocity dδ/dt is the fourth setting steering angular velocity dδ$_4$/dt or more and less than the fifth setting steering angular velocity dδ$_5$/dt (time of middle-velocity steering). In such a way, the feedback axial force calculation executing unit 11Bbe sets, to the feedback axial force T$_{FB}$, a sum of a value obtained by multiplying the current axial force by the variable K5 and of a value obtained by multiplying the blend axial force T$_{BR}$ by (1−K5). Meanwhile, in a case where the variable K4 is 0.0 (time of the steering returning operation), the allocation ratio setting unit 11Bbf sets 0.0 for the allocation ratio GB irrespective of the steering angular velocity dδ/dt. Then, the feedback axial force calculation executing unit 11Bbe sets the blend axial force T$_{BR}$ to the feedback axial force T$_{FB}$.

As described above, when the steering increasing operation of the steering wheel 1 is performed, the feedback axial force calculation executing unit 11Bbe in one embodiment of the present disclosure sets the current axial force to the feedback axial force T$_{FB}$ in the case where the absolute value of the steering angular velocity dδ/dt is less than the fourth setting steering angular velocity dδ$_4$/dt. Here, in the mechanical steering control device in which the steering wheel 1 and the steered wheels 2 are mechanically coupled to each other, the steering reaction force to return the steering wheel 1 to the neutral position is generated by the tire lateral force Fd and the friction, which follow the turning of the steered wheels 2, at the time of the steering increasing operation of the steering wheel 1. Moreover, in the feedback axial force calculation executing unit 11Bbe in one embodiment of the present disclosure, the current axial force becomes equal to a sum of the tire lateral force Fd and the friction at the time of the steering increasing operation of the steering wheel 1. Therefore, by setting the current axial force to the feedback axial force T$_{FB}$, the control computing unit 11 in one embodiment of the present disclosure can apply the steering reaction force to return the steering wheel 1 to the neutral position in a similar way to the mechanical steering control device. In such a way, at the time of the steering increasing operation of the steering wheel 1, the control computing unit 11 in one embodiment of the present disclosure can apply more appropriate steering reaction force.

Incidentally, in the blend axial force T$_{BR}$, an element of the friction following the turning of the steered wheels 2 is not contained. Therefore, for example, at the time of the steering increasing operation of the steering wheel 1, there is a possibility that the feeling of wrongness may be given to the steering feeling in accordance with such a method of setting the blend axial force T$_{BR}$ to the feedback axial force T$_{FB}$.

Moreover, when the steering returning operation of the steering wheel 1 is performed, the feedback axial force calculation executing unit 11Bbe in one embodiment of the present disclosure sets the blend axial force T$_{BR}$, in which the current axial force and the lateral G axial force are allocated at a preset allocation ratio, to the feedback axial force T$_{FB}$ irrespective of the magnitude of the absolute value of the steering angular velocity dδ/dt. Here, in the mechanical steering control device in which the steering wheel 1 and the steered wheels 2 are mechanically coupled to each other, the steering reaction force to return the steering wheel 1 to the neutral position is generated by the tire lateral force Fd, which follows the turning of the steered wheels 2, at the time of the steering returning operation of the steering wheel 1. Therefore, in the mechanical steering control device, at the time of the steering returning operation of the steering wheel 1, the driver has reduced holding force for the steering wheel 1, has slid the steering wheel 1 on the palm, has thereby returned the steering wheel 1 to the neutral position, and has returned the steered wheels 2 to the neutral position. In contrast, in the feedback axial force calculation executing unit 11Bbe in one embodiment of the present disclosure, the blend axial force T$_{BR}$ is set to the feedback axial force T$_{FB}$, whereby the steering reaction force to return the steering wheel 1 to the neutral position can be suppressed from being decreased even if the turning current is decreased and the current axial force is decreased. Therefore, the feedback axial force calculation executing unit 11Bbe in one embodiment of the present disclosure can return the steering wheel 1 to the neutral position in such a manner that the driver reduces the holding force for the steering wheel 1 and slides the steering wheel 1 on the palm in a similar way to the mechanical steering control device. In such a way, at the time of the steering returning operation of the steering wheel 1, the control computing unit 11 in one embodiment of the present disclosure can apply more appropriate steering reaction force.

Moreover, in a case of having determined that the steering increasing operation of the steering wheel 1 is performed, and having determined that the absolute value of the steering angular velocity dδ/dt is the fourth setting steering angular velocity dδ$_4$/dt or more, the feedback axial force calculation executing unit 11Bbe in one embodiment of the present disclosure allocates the current axial force and the blend axial force T$_{BR}$ to set the feedback axial force T$_{FB}$, and in addition, increases the allocation ratio of the current axial force as the absolute value of the steering angular velocity dδ/dt becomes smaller. Therefore, for example, in a case where the steering angle δ goes beyond the neutral position during the steering returning operation of the steering wheel 1 and subsequently the steering increasing operation of the steering wheel 1 is performed in the same direction as that of the steering returning operation, then the feedback axial force calculation executing unit 11Bbe in one embodiment of the present disclosure can gradually shift the feedback axial force $T_{FB}$ from the blend axial force $T_{BR}$ to the current axial force as the absolute value of the steering angular velocity dδ/dt is gradually decreased during the steering increasing operation. In such a way, the control computing unit 11 in one embodiment of the present disclosure can apply more appropriate steering reaction force.

Returning to FIG. 3, the final axial force calculating unit 11Bc reads the steering angle δ, the vehicle velocity V, the lateral acceleration Gy, the feedforward axial force $T_{FF}$ and the feedback axial force $T_{FB}$ from the steering angle sensor 3, the vehicle velocity sensor 5, the lateral G sensor 6, the feedforward axial force calculating unit 11Ba and the feedback axial force calculating unit 11Bb, respectively. Subsequently, the final axial force calculating unit 11Bc calculates the steering angular velocity dδ/dt of the steering wheel 1 based on the read steering angle δ. Subsequently, the final axial force calculating unit 11Bc calculates steering rack axial force (final axial force) in accordance with a following formula (12) based on the steering angle δ, the vehicle velocity V, the lateral acceleration Gy, the feedforward axial force $T_{FF}$ and the feedback axial force $T_{FB}$, which are thus read, and based on the calculated steering angular velocity dδ/dt. Then, the final axial force calculating unit 11Bc outputs a result of the calculation to the axial force-steering reaction force converting unit 11Bd.

Final axial force=feedforward axial force $T_{FF}$×GF+ feedback axial force $T_{FB}$×(1−GF)    (12)

Here, GF is a numeric value representing an allocation ratio GF of the feedforward axial force $T_{FF}$ and an allocation ratio (1−GF) of the feedback axial force $T_{FB}$ (hereinafter, this numeric value is referred to as an allocation ratio). In such a way, based on the allocation ratio GF, the final axial force calculating unit 11Bc adds the feedforward axial force $T_{FF}$ and the feedback axial force $T_{FB}$ to each other in a ratio of GF:(1−GF), and calculates the final axial force.

In such a way, the final axial force calculating unit 11Bc in one embodiment of the present disclosure calculates the final axial force based on the feedback axial force $T_{FB}$ and the feedforward axial force $T_{FF}$. Here, the feedback axial force $T_{FB}$ reflects the influence of the tire lateral force Fd acting on the steered wheels 2, and accordingly, changes in response to a change of a road surface state and a change of a vehicle state. In contrast, the feedforward axial force $T_{FF}$ does not reflect the influence of the tire lateral force Fd, and accordingly, changes smoothly irrespective of the change of the road surface state, or the like. Therefore, the final axial force calculating unit 11Bc calculates the final axial force based on the feedforward axial force $T_{FF}$ in addition to the feedback axial force $T_{FB}$, and can thereby calculate more appropriate final axial force.

The final axial force calculating unit 11Bc includes an allocation ratio calculating unit 11Bca. The allocation ratio calculating unit 11Bca sets the allocation ratio GF based on an allocation ratio $GF_1$ that is based on an axial force difference, based on an allocation ratio $GF_2$ that is based on the lateral acceleration Gy, based on an allocation ratio $GF_3$ that is based on the vehicle velocity V and the steering angle δ, and based on an allocation ratio $GF_4$ that is based on the steering angular velocity dδ/dt. As the axial force difference, for example, a difference between the feedforward axial force $T_{FF}$ and the feedback axial force $T_{FB}$ can be employed. Specifically, the axial force difference is set to be a subtraction result obtained by subtracting the feedback axial force $T_{FB}$ from the feedforward axial force $T_{FF}$. Moreover, as a method for setting the allocation ratio GF, for example, there can be employed a method of multiplying a smaller value between the allocation ratio $GF_1$ that is based on the axial force difference and the allocation ratio $GF_2$ that is based on the lateral acceleration Gy, the allocation ratio $GF_3$ that is based on the vehicle velocity V and the steering angle δ and the allocation ratio $GF_4$ that is based on the steering angular velocity dδ/dt by one another, and setting a result of the multiplication to the allocation ratio GF.

Figure 15:
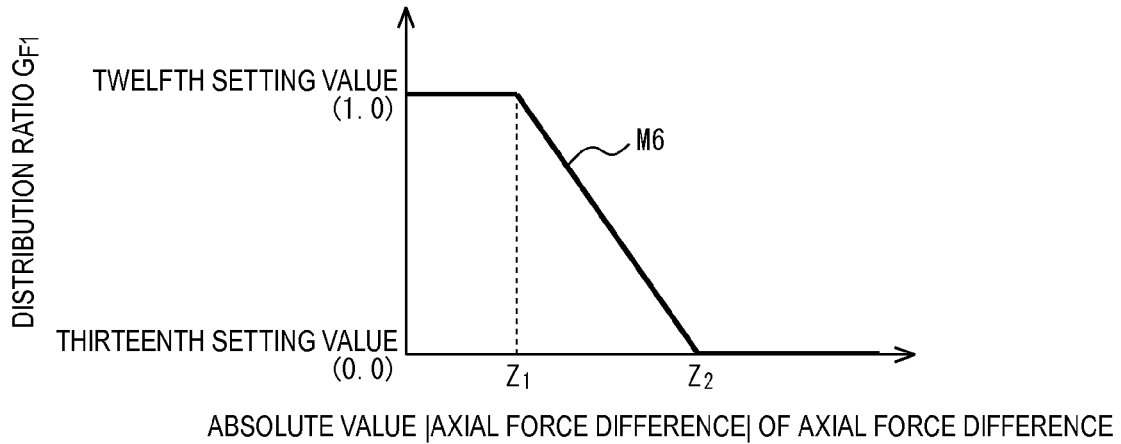
FIG. 15 is a graph illustrating a control map M6.

FIG. 15 is a graph illustrating a control map M6. Moreover, as a method for setting the allocation ratio $GF_1$, for example, there can be employed a method of reading an allocation ratio $GF_1$, which corresponds to an absolute value of the axial force difference, from the control map M6. As the control map M6, for example, there is a map in which the allocation ratio $GF_1$ corresponding to the absolute value of the axial force difference is registered. Specifically, as illustrated in FIG. 15, in a range where the absolute value of the axial force difference is 0 or more and less than a first setting axial force difference $Z_1$ (>0), the control map M6 sets the allocation ratio $GF_1$ to a twelfth setting value (for example, 1.0) irrespective of a magnitude of the axial force difference. As the first setting axial force difference $Z_1$, for example, an axial force difference at which estimation accuracy for the feedforward axial force $T_{FF}$ starts to be decreased can be employed. Moreover, in a range where the absolute value of the axial force difference is a second setting axial force difference $Z_2$ (>$Z_1$) or more, the control map M6 sets the allocation ratio $GF_1$ to a thirteenth setting value (<twelfth setting value; for example, 0.0) irrespective of the magnitude of the axial force difference. As the second setting axial force difference $Z_2$, for example, there can be employed an axial force difference at which the estimation accuracy for the feedforward axial force $T_{FF}$ becomes lower than estimation accuracy for the feedback axial force $T_{FB}$. Moreover, in a range where the absolute value of the axial force difference is the first setting axial force difference $Z_1$ or more and less than the second setting axial force difference $Z_2$, the control map M6 linearly decreases the allocation ratio $GF_1$ in response to the absolute value of the axial force difference. Specifically, in the range where the absolute value of the axial force difference is the first setting axial force difference $Z_1$ or more and less than the second setting axial force difference $Z_2$, the control map M6 sets the allocation ratio $GF_1$ in accordance with a linear function representing a relationship between the absolute value of the axial force difference and the allocation ratio $GF_1$. In the linear function, the allocation ratio $GF_1$ is set to the twelfth setting value (1.0) in a case where the absolute value of the axial force difference is the first setting axial force difference $Z_1$, and the allocation ratio $GF_1$ is set to the thirteenth setting value (0.0) in a case where the absolute value of the axial force difference is the second setting axial force difference $Z_2$.

As described above, in the case where the absolute value of the axial force difference is the first setting axial force difference $Z_1$ or more, the final axial force calculating unit 11Bc in one embodiment of the present disclosure lowers the allocation ratio $GF_1$ (allocation ratio GF of the feedforward axial force TFF) more than in the case where the absolute value of the axial force difference is less than the first setting axial force difference $Z_1$. Therefore, for example, in a case where road surface μ is decreased, the estimation accuracy for the feedforward axial force $T_{FF}$ is decreased, and the axial force difference is increased, then the final axial force calculating unit 11Bc in one embodiment of the present disclosure can increase the allocation ratio (1−GF) of the feedback axial force $T_{FB}$. Therefore, the final axial force calculating unit 11Bc in one embodiment of the present disclosure can apply more appropriate steering reaction force.

Figure 16:
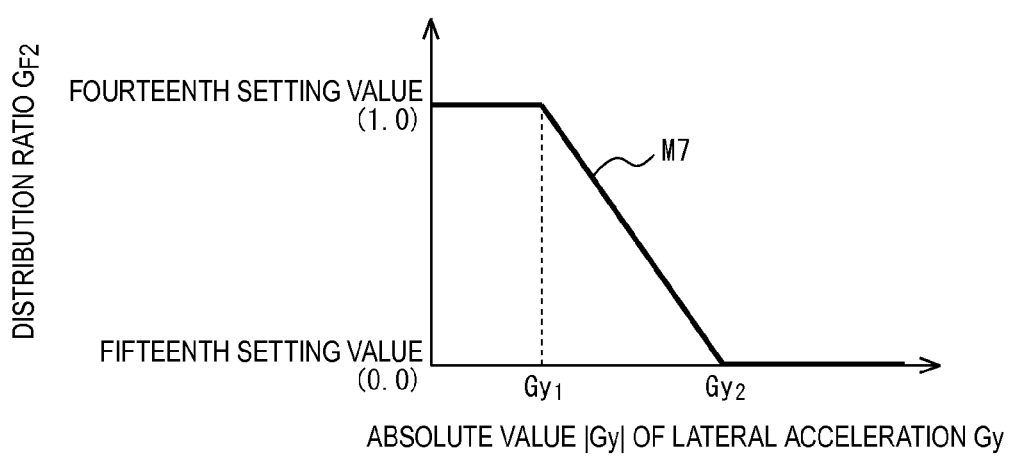
FIG. 16 is a graph illustrating a control map M7.

FIG. 16 is a graph illustrating a control map M7. Here, as a method for setting the allocation ratio $GF_2$, for example, there can be employed a method of reading an allocation ratio $GF_2$, which corresponds to an absolute value of the lateral acceleration Gy, from the control map M7. As the control map M7, for example, there is a map in which the allocation ratio $GF_2$ corresponding to the absolute value of the lateral acceleration Gy is registered. Specifically, as illustrated in FIG. 16, in a range where the absolute value of the lateral acceleration Gy is 0 or more and less than a first setting lateral acceleration $Gy_1$ (>0), the control map M7 sets the allocation ratio $GF_2$ to a fourteenth setting value (for example, 1.0) irrespective of a magnitude of the lateral acceleration Gy. As the first setting lateral acceleration $Gy_1$, for example, a lateral acceleration Gy at which the estimation accuracy for the feedforward axial force $T_{FF}$ starts to be decreased can be employed. Moreover, in a range where the absolute value of the lateral acceleration Gy is a second setting lateral acceleration $Gy_2$ (>$Gy_1$) or more, the control map M7 sets the allocation ratio $GF_2$ to a fifteenth setting value (<fourteenth setting value; for example, 0.0) irrespective of the magnitude of the lateral acceleration Gy. As the second setting lateral acceleration $Gy_2$, for example, there can be employed a lateral acceleration Gy at which the estimation accuracy for the feedforward axial force $T_{FF}$ becomes lower than the estimation accuracy for the feedback axial force $T_{FB}$. Moreover, in a range where the absolute value of the lateral acceleration Gy is the first setting lateral acceleration $Gy_1$ or more and less than the second setting lateral acceleration $Gy_2$, the control map M7 linearly decreases the allocation ratio $GF_2$ in response to the absolute value of the lateral acceleration Gy. Specifically, in the range where the absolute value of the lateral acceleration Gy is the first setting lateral acceleration $Gy_1$ or more and less than the second setting lateral acceleration $Gy_2$, the control map M7 sets the allocation ratio $GF_2$ in accordance with a linear function representing a relationship between the absolute value of the lateral acceleration Gy and the allocation ratio $GF_2$. In the linear function, the allocation ratio GF3 is set to the fourteenth setting value (1.0) in a case where the absolute value of the lateral acceleration Gy is the first setting lateral acceleration $Gy_1$, and the allocation ratio GF3 is set to the fifteenth setting value (0.0) in a case where the absolute value of the lateral acceleration Gy is the second setting lateral acceleration $Gy_2$.

As described above, in the case where the absolute value of the lateral acceleration Gy is the first setting lateral acceleration $Gy_1$ or more, the final axial force calculating unit 11Bc in one embodiment of the present disclosure lowers the allocation ratio $GF_2$ (allocation ratio GF of the feedforward axial force TFF) more than in the case where the absolute value of the lateral acceleration Gy is less than the first setting lateral acceleration $Gy_1$. Therefore, for example, in a case where the lateral acceleration Gy is increased, and the estimation accuracy for the feedforward axial force $T_{FF}$ is decreased, then the final axial force calculating unit 11Bc in one embodiment of the present disclosure can increase the allocation ratio (1−GF) of the feedback axial force $T_{FB}$. Accordingly, the final axial force calculating unit 11Bc in one embodiment of the present disclosure can apply more appropriate steering reaction force.

Figure 17A:
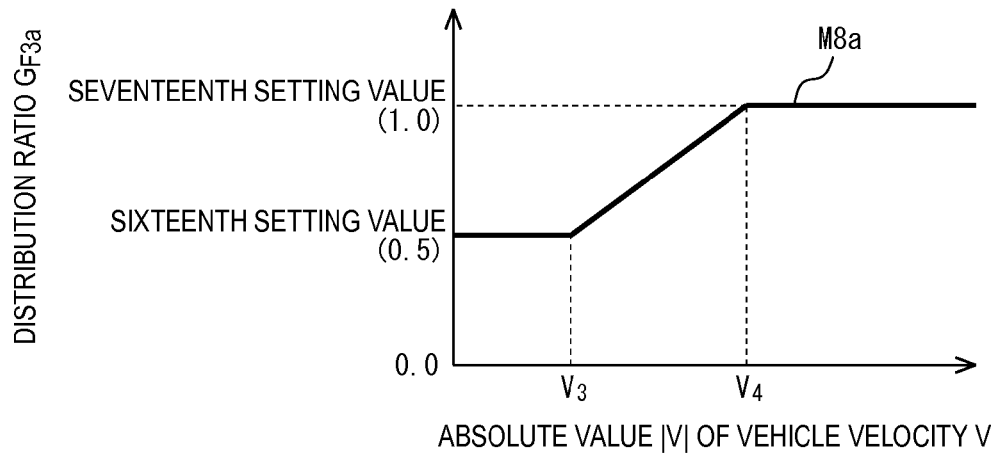
FIGS. 17A and 17B are graphs illustrating control maps M8*a* and M8*b*.
Figure 17B:
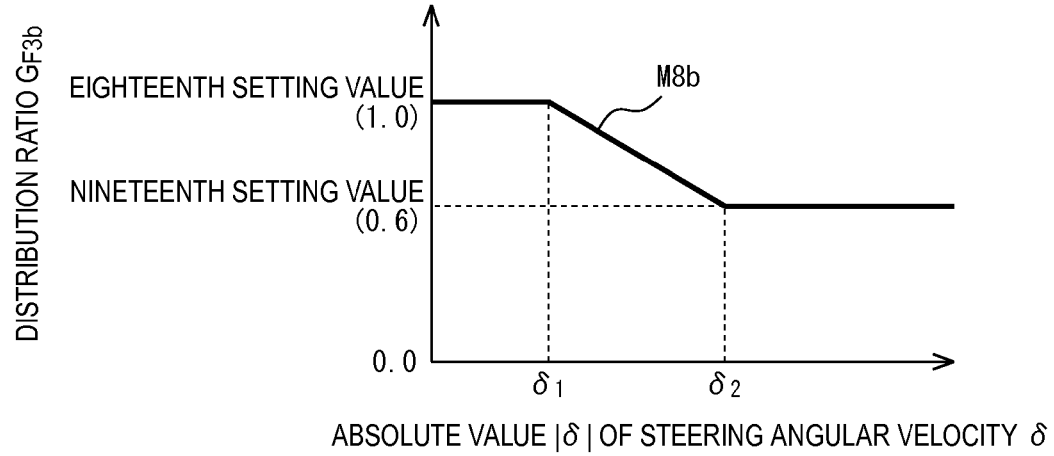

FIGS. 17A and 17B are graphs illustrating control maps M8a and M8b. Here, as a method for setting the allocation ratio $GF_3$, for example, there can be employed a method of reading allocation ratios $GF_{3a}$ and $GF_{3b}$, which correspond to the absolute value of the vehicle velocity V and the absolute value of the steering angle δ, from the control maps M8a and M8b, multiplying the read allocation ratios $GF_{3a}$ and $GF_{3b}$ by each other, and setting a result of the multiplication to the allocation ratio $GF_3$. As the control map M8a, for example, there is a map in which the allocation ratio $GF_3$ corresponding to the absolute value of the vehicle velocity V is registered. Specifically, as illustrated in FIG. 17A, in a range where the absolute value of the vehicle velocity V is 0 or more and less than a third setting vehicle velocity $V_3$, the control map M8a sets an allocation ratio $GF_{3a}$ to a sixteenth setting value (for example, 0.5) irrespective of the magnitude of the vehicle velocity V. As the third setting vehicle velocity $V_3$, for example, there can be employed a vehicle velocity V, at which nonlinearity (nonlinearity of the tire lateral force Fd with respect to a tire slip angle) of tire characteristics due to a low vehicle velocity V appears, and the estimation accuracy for the feedforward axial force $T_{FF}$ starts to be decreased. Moreover, in a range where the absolute value of the vehicle velocity V is a fourth setting vehicle velocity $V_4$ (>$V_3$) or more, the control map M8a sets the allocation ratio $GF_{3a}$ to a seventeenth setting value (>sixteenth setting value; for example, 1.0) irrespective of the magnitude of the vehicle velocity V. As the fourth setting vehicle velocity $V_4$, for example, there can be employed a vehicle velocity V at which the estimation accuracy for the feedforward axial force $T_{FF}$ is enhanced more than the estimation accuracy for the feedback axial force $T_{FB}$. Furthermore, in a range where the absolute value of the vehicle velocity V is the third setting vehicle velocity $V_3$ or more and less than the fourth setting vehicle velocity $V_4$, the control map M8a linearly increases the allocation ratio $GF_{3a}$ in response to the absolute value of the vehicle velocity V. Specifically, in the range where the absolute value of the vehicle velocity V is the third setting vehicle velocity $V_3$ or more and less than the fourth setting vehicle velocity $V_4$, the control map M8a sets the allocation ratio $GF_{3a}$ in accordance with a linear function representing a relationship between vehicle velocity V and the allocation ratio $GF_{3a}$. In the linear function, the allocation ratio $GF_{3a}$ is set to the sixteenth setting value (0.5) in a case where the absolute value of the vehicle velocity V is the third setting vehicle velocity $V_3$, and the allocation ratio $GF_{3a}$ is set to the seventeenth setting value (1.0) in a case where the vehicle velocity V is the fourth setting vehicle velocity $V_4$.

As described above, in the case where the absolute value of the vehicle velocity V is less than the fourth setting vehicle velocity $V_4$, the final axial force calculating unit 11Bc in one embodiment of the present disclosure lowers the allocation ratio $GF_{3a}$ (allocation ratio GF of the feedforward axial force TFF) more than in the case where the absolute value of the vehicle velocity V is the fourth setting vehicle velocity $V_4$ or more. Therefore, for example, in a case where the vehicle velocity V is decreased, and the estimation accuracy for the feedforward axial force $T_{FF}$ is decreased, then the final axial force calculating unit 11Bc in one embodiment of the present disclosure can increase the allocation ratio (1−GF) of the feedback axial force $T_{FB}$. Therefore, the final axial force calculating unit 11Bc in one embodiment of the present disclosure can apply more appropriate steering reaction force.

Moreover, as the control map M8b, for example, there is a map in which the allocation ratio $GF_{3b}$ corresponding to the absolute value of the steering angle δ is registered. Specifically, as illustrated in FIG. 17B, in a range where the absolute value of the steering angle δ is 0 or more and less than a first setting steering angle $δ_1$ (>0), the control map M8b sets an allocation ratio $GF_{3b}$ to an eighteenth setting value (for example, 1.0) irrespective of the magnitude of the steering angle δ. As the first setting steering angle $δ_1$, for example, a steering angle δ at which the estimation accuracy for the feedforward axial force $T_{FF}$ starts to be decreased can be employed. Moreover, in a range where the absolute value of the steering angle δ is a second setting steering angle $δ_2$ (>$δ_1$) or more, the control map M8b sets the allocation ratio $GF_{3b}$ to a nineteenth setting value (<eighteenth setting value; for example, 0.6) irrespective of the magnitude of the steering angle δ. As the second setting steering angle $δ_2$, for example, there can be employed a steering angle δ at which the estimation accuracy for the feedforward axial force $T_{FF}$ becomes lower than the estimation accuracy for the feedback axial force $T_{FB}$. Furthermore, in a range where the absolute value of the steering angle δ is the first setting steering angle $δ_1$ or more and less than the second setting steering angle $δ_2$, the control map M8b linearly decreases the allocation ratio $GF_{3b}$ in response to the absolute value of the steering angle δ. Specifically, in the range where the absolute value of the steering angle δ is the first setting steering angle $δ_1$ or more and less than the second setting steering angle $δ_2$, the control map M8b sets the allocation ratio $GF_{3b}$ in accordance with a linear function representing a relationship between the absolute value of the steering angle δ and the allocation ratio $GF_{3b}$. In the linear function, the allocation ratio $GF_{3b}$ is set to the eighteenth setting value (1.0) in a case where the absolute value of the steering angle δ is the first setting steering angle $δ_1$, and the allocation ratio GF3 is set to the nineteenth setting value (0.6) in a case where the absolute value of the steering angle δ is the second setting steering angle $δ_2$.

As described above, in the case where the absolute value of the steering angle δ is the first setting steering angle $δ_1$ or more, the final axial force calculating unit 11Bc in one embodiment of the present disclosure lowers the allocation ratio $GF_{3b}$ (allocation ratio GF of the feedforward axial force TFF) more than in the case where the absolute value of the steering angle 6 is less than the first setting steering angle $δ_1$. Therefore, for example, in a case where the steering angle δ is increased, and the estimation accuracy for the feedforward axial force $T_{FF}$ is decreased, then the final axial force calculating unit 11Bc in one embodiment of the present disclosure can increase the allocation ratio (1−GF) of the feedback axial force $T_{FB}$. Therefore, the final axial force calculating unit 11Bc in one embodiment of the present disclosure can apply more appropriate steering reaction force.

Figure 18:
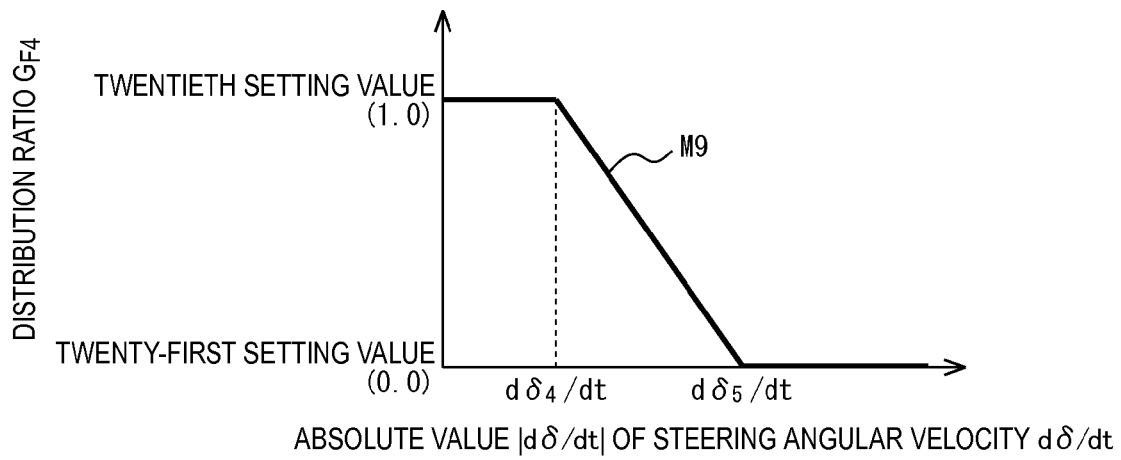
FIG. 18 is a graph illustrating a control map M9.

FIG. 18 is a graph illustrating a control map M9. Here, as a method for setting the allocation ratio $GF_4$, for example, there can be employed a method of reading an allocation ratio $GF_4$, which corresponds to an absolute value of the steering angular velocity dδ/dt, from the control map M9. As the control map M9, for example, there is a map in which the allocation ratio $GF_4$ corresponding to the absolute value of the steering angular velocity dδ/dt is registered. Specifically, as illustrated in FIG. 18, in the range where the absolute value of the steering angular velocity dδ/dt is 0 or more and less than the fourth setting steering angular velocity $dδ_4$/dt (>0), the control map M9 sets the allocation ratio $GF_4$ to a twentieth setting value (for example, 1.0) irrespective of the magnitude of the steering angular velocity dδ/dt. As the fourth setting steering angular velocity $dδ_4$/dt, for example, a steering angular velocity dδ/dt at which the estimation accuracy for the feedforward axial force $T_{FF}$ starts to be decreased can be employed. Moreover, in a range where the absolute value of the steering angular velocity dδ/dt is the fifth setting steering angular velocity $d_5$/dt (>$dδ_4$/dt) or more, the control map M9 sets the allocation ratio $GF_4$ to a twenty-first setting value (<twentieth setting value; for example, 0.0) irrespective of the magnitude of the steering angular velocity dδ/dt. As the fifth setting steering angular velocity $dδ_5$/dt, for example, there can be employed a steering angular velocity dδ/dt at which the estimation accuracy for the feedforward axial force $T_{FF}$ becomes lower than the estimation accuracy for the feedback axial force $T_{FB}$. Furthermore, in a range where the absolute value of the steering angular velocity dδ/dt is the fourth setting steering angular velocity $dδ_4$/dt or more and less than the fifth setting steering angular velocity $dδ_5$/dt, the control map M9 linearly decreases the allocation ratio $GF_4$ in response to the absolute value of the steering angular velocity dδ/dt. Specifically, in the range where the absolute value of the steering angular velocity dδ/dt is the fourth setting steering angular velocity $dδ_4$/dt or more and less than the fifth setting steering angular velocity $d_5$/dt, the control map M9 sets the allocation ratio $GF_4$ in accordance with a linear function representing a relationship between the absolute value of the steering angular velocity dδ/dt and the allocation ratio $GF_4$. In the linear function, the allocation ratio $GF_4$ is set to the twentieth setting value (1.0) in a case where the absolute value of the steering angular velocity dδ/dt is the fourth setting steering angular velocity $dδ_4$/dt, and the allocation ratio $GF_4$ is set to the twenty-first setting value (0.0) in a case where the absolute value of the steering angular velocity dδ/dt is the fifth setting steering angular velocity $dδ_5$/dt.

As described above, in the case where the absolute value of the steering angular velocity dδ/dt is the fourth setting steering angular velocity $dδ_4$/dt or more, the final axial force calculating unit 11Bc in one embodiment of the present disclosure lowers the allocation ratio $GF_4$ (allocation ratio GF of the feedforward axial force TFF) more than in the case where the absolute value of the steering angular velocity dδ/dt is less than the fourth setting steering angular velocity $dδ_4$/dt. Therefore, for example, in a case where the steering angular velocity dδ/dt is increased, and the estimation accuracy for the feedforward axial force $T_{FF}$ is decreased, then the final axial force calculating unit 11Bc in one embodiment of the present disclosure can increase the allocation ratio (1−GF) of the feedback axial force $T_{FB}$. Therefore, the final axial force calculating unit 11Bc in one embodiment of the present disclosure can apply more appropriate steering reaction force.

In such a way, the final axial force calculating unit 11Bc sets the feedforward axial force $T_{FF}$ to the final axial force in a case where the absolute value of the axial force difference is less than the first setting axial force difference $Z_1$, the absolute value of the lateral acceleration Gy is less than the first setting lateral acceleration $Gy_1$, the absolute value of the vehicle velocity V is the fourth setting vehicle velocity $V_4$ or more, the absolute value of the steering angle δ is less than the first setting steering angle $δ_1$, and the absolute value of the steering angular velocity dδ/dt is less than the fourth setting steering angular velocity $dδ_4$/dt. Moreover, the final axial force calculating unit 11Bc sets the feedback axial force $T_{FB}$ to the final axial force in at least one of cases where the absolute value of the axial force difference is the second setting axial force difference $Z_2$ or more, the absolute value of the lateral acceleration Gy is the second setting lateral acceleration $Gy_2$ or more, and the absolute value of the steering angular velocity dδ/dt is the fifth setting steering angular velocity $dδ_5$/dt or more. Moreover, the final axial force calculating unit 11Bc sets, to the final axial force, the sum, which is composed of the value obtained by multiplying the feedforward axial force $T_{FF}$ by the allocation ratio GF and of the value obtained by multiplying the feedback axial force $T_{FB}$ by the allocation ratio (1−GF), in a case where the absolute value of the axial force difference is the first setting axial force difference $Z_1$ or more and less than the second setting axial force difference $Z_2$, the absolute value of the lateral acceleration Gy is the first setting lateral acceleration $Gy_1$ or more and less than the second setting lateral acceleration $Gy_2$, the absolute value of the vehicle velocity V is less than the fourth setting vehicle velocity $V_4$, the absolute value of the steering angle δ is the first setting steering angle $δ_1$ or more, and the absolute value of the steering angular velocity dδ/dt is the fourth setting steering angular velocity $dδ_4/dt$ or more.

Therefore, the final axial force calculating unit 11Bc sets the feedforward axial force $T_{FF}$ to the final axial force in such a situation where the vehicle A is in a state where the road surface μ of the road is high (dry road surface), the vehicle velocity V is high, the steering angle δ is small, and the steering angular velocity dδ/dt is small (hereinafter, this situation is also referred to as a specific situation). Here, the feedforward axial force $T_{FF}$ does not reflect on the influence of the tire lateral force Fd, and accordingly, changes smoothly irrespective of the change of the road surface state, or the like. Therefore, the final axial force calculating unit 11Bc can realize a stable steering feeing in such a case where the vehicle A is in the specific situation. In contrast, in a case where the vehicle A is in a situation other than the specific situation (hereinafter, this other situation is also referred to as a usual situation), the final axial force calculating unit 11Bc sets, to the final axial force, the feedback axial force $T_{FB}$ or the sum of the feedforward axial force $T_{FF}$ and the feedback axial force $T_{FB}$. Here, the feedback axial force $T_{FB}$ reflects the influence of the tire lateral force Fd acting on the steered wheels 2, and accordingly, changes in response to the change of the road surface state and the change of the vehicle state. Therefore, in a case where the vehicle A is in the usual situation, the final axial force calculating unit 11Bc can impart a steering feeling similar to that of the mechanical steering control device in which the steering wheel 1 and the steered wheels 2 are mechanically coupled to each other, and can realize a natural steering feeling.

Returning to FIG. 3, the axial force-steering reaction force converting unit 11Bd calculates the target steering reaction force based on the final axial force calculated by the final axial force calculating unit 11Bc. The target steering reaction force is a target value of the steering reaction force. As a method for calculating the target steering reaction force, there can be employed a method of reading target steering reaction force, which corresponds to the vehicle velocity V and the final axial force, from a control map M10. The control map M10 is a map in which target steering reaction force corresponding to the final axial force is registered for each vehicle velocity V.

Figure 19:
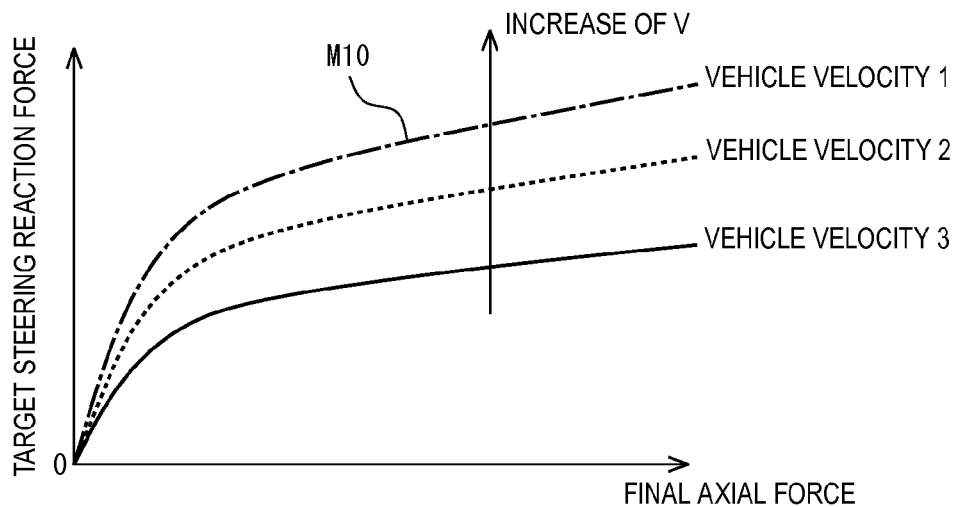
FIG. 19 is a graph illustrating a control map M10.

FIG. 19 is a graph illustrating the control map M10. As illustrated in FIG. 19, the control map M10 is set for each vehicle velocity V. Moreover, the control map M10 sets the target steering reaction force to a larger value as the final axial force is larger.

Returning to FIG. 3, the target reaction force current computing unit 11Be calculates the target reaction force current in accordance with a following formula (13) based on the target steering reaction force calculated by the axial force-steering reaction force converting unit 11Bd. Then, the target reaction force current computing unit 11Be outputs a result of the calculation to the reaction force motor drive unit 9C.

Target reaction force current=target steering reaction force×gain (13)

Note that, in one embodiment of the present disclosure, an example is illustrated, where the target reaction force current computing unit 11Be calculates the target reaction force current based on the target steering reaction force calculated by the axial force-steering reaction force converting unit 11Bd; however, other configurations can also be adopted. For example, such a configuration may be employed, in which the target reaction force current computing unit 11Be adds compensatory reaction force, end abutment reaction force or the like to the target steering reaction force calculated by the axial force-steering reaction force converting unit 11Bd, thereby corrects the target steering reaction force, and calculates the target reaction force current based on the corrected target steering reaction force. As the compensatory reaction force, for example, there is steering reaction force applied in a case of correcting the target steering reaction force. Moreover, as the end abutment reaction force, for example, there is steering reaction force applied in a case where the turning angle θ becomes the maximum value.

(Operations and the Like)

Figure 20:
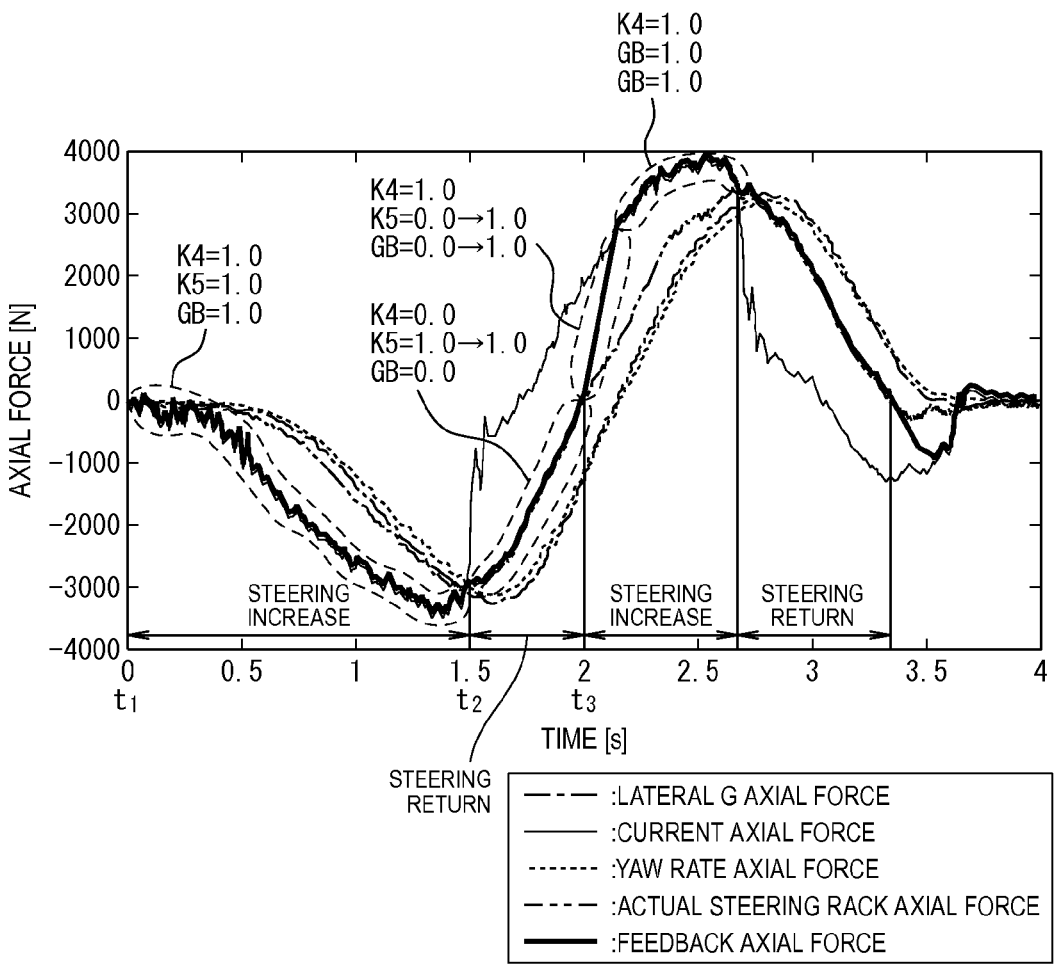
FIG. 20 is a diagram illustrating operations of the steering control device of the vehicle A.

Next, a description is made of operations of the steering control device of the vehicle A. FIG. 20 is a diagram for explaining the operations of the steering control device of the vehicle A. As shown at a time t1 of FIG. 20, it is assumed that the driver performs the steering increasing operation of the steering wheel 1 while the vehicle A is traveling. Then, the control computing unit 11 calculates the target turning angle θ* based on the steering angle δ and the vehicle velocity V (the target turning angle computing unit 11A in FIG. 2). Subsequently, the control computing unit 11 calculates the target turning current based on a result of subtraction, which is obtained by subtracting the actual turning angle θ from the calculated target turning angle θ* (the target turning current computing unit 11C in FIG. 2). In such a way, the turning control unit 8 steers the steered wheels 2 in response to an operation amount for the steering wheel 1.

Moreover, the control computing unit 11 also calculates the feedforward axial force $T_{FF}$ based on the steering angle δ and the vehicle velocity V (the feedforward axial force calculating unit 11Ba in FIG. 3). Subsequently, the control computing unit 11 calculates the current axial force based on the turning current (the current axial force calculating unit 11Bba in FIG. 11). Subsequently, the control computing unit 11 calculates the lateral G axial force based on the lateral acceleration Gy (the blend axial force calculating unit 11Bbb in FIG. 11). Subsequently, the control computing unit 11 calculates the yaw rate axial force based on the yaw rate γ and the vehicle velocity V (the blend axial force calculating unit 11Bbb in FIG. 11). Subsequently, the control computing unit 11 adds the value, which is obtained by multiplying the calculated current axial force by the allocation ratio K2, the value, which is obtained by multiplying the calculated lateral G axial force by the allocation ratio K1, and the value, which is obtained by multiplying the yaw rate axial force by the allocation ratio K3, to one another, and sets a result of the addition to the blend axial force $T_{BR}$ (the blend axial force calculating unit 11Bbb in FIG. 11). The allocation ratios K1, K2 and K3 of the lateral G axial force, the current axial force and the yaw rate axial force are set to 0.6:0.3:0.1. Here, it is assumed that the absolute value of the steering angular velocity dδ/dt is less than the fourth setting steering angular velocity $dδ_4/dt$. Then, the variable K4 becomes 1.0, the variable K5 becomes 1.0, and the allocation ratio GB (=K4×K5) becomes 1.0 (the feedback axial force calculation executing unit 11Bbe in FIG. 11). Then, the control computing unit 11 allocates the current axial force and the blend axial force $T_{BR}$, which are thus calculated, in a ratio of GB:(1−GB), and sets the current axial force to the feedback axial force $T_{FB}$ (the feedback axial force calculating unit 11Bb in FIG. 3). Subsequently, the control computing unit 11 allocates the feedforward axial force $T_{FF}$ and the feedback axial force $T_{FB}$, which are thus calculated, in a ratio of GF:(1−GF), and calculates the final axial force (the final axial force calculating unit 11Bc in FIG. 3). Subsequently, the control computing unit 11 calculates the target steering reaction force based on the calculated final axial force (the axial force-steering reaction force converting unit 11Bd in FIG. 3). Subsequently, the control computing unit 11 calculates the target reaction force current based on the calculated target steering reaction force (the target reaction force current computing unit 11Be in FIG. 3). Subsequently, the control computing unit 11 drives the reaction force motor 9A based on the calculated target reaction force current (the reaction force motor drive unit 9C in FIG. 2). In such a way, the reaction force control unit 9 applies the steering reaction force to the steering wheel 1.

As described above, the steering control device in one embodiment of the present disclosure calculates the feedback axial force $T_{FB}$ based on the current axial force, the blend axial force $T_{BR}$, and the determination result of the steering increasing operation and the steering returning operation. Therefore, the steering control device in one embodiment of the present disclosure can calculate the feedback axial force $T_{FB}$ based on detection results of sensors provided in a general vehicle, the detection results including the turning current of the turning motor 8A, the lateral acceleration Gy of the vehicle A, and the like. Therefore, since the steering control device in one embodiment of the present disclosure drives the reaction force motor 9A based on the feedback axial force $T_{FB}$, it is not necessary for the steering control device to include a dedicated sensor for detecting the steering rack axial force, and an increase in manufacturing cost can be suppressed.

Moreover, when the steering increasing operation of the steering wheel 1 is performed, the steering control device in one embodiment of the present disclosure sets the current axial force to the feedback axial force $T_{FB}$ in the case where the absolute value of the steering angular velocity dδ/dt is less than the fourth setting steering angular velocity $dδ_4$/dt. Therefore, by setting the current axial force to the feedback axial force $T_{FB}$, the steering control device in one embodiment of the present disclosure can apply the steering reaction force to return the steering wheel 1 to the neutral position in a similar way to the mechanical steering control device in which the steering wheel 1 and the steered wheels 2 are mechanically coupled to each other. In such a way, at the time of the steering increasing operation of the steering wheel 1, the steering control device in one embodiment of the present disclosure can apply more appropriate steering reaction force.

Here, as shown at a time t2 of FIG. 20, it is assumed that the driver finishes the steering increasing operation of the steering wheel 1, and performs the steering returning operation. Then, the variable K4 becomes 0.0, and the allocation ratio GB (=K4×K5) becomes 0.0 irrespective of the variable K5 (the feedback axial force calculation executing unit 11Bbe in FIG. 11). Then, the control computing unit 11 allocates the current axial force and the blend axial force $T_{BR}$, which are thus calculated, in the ratio of GB:(1−GB), and calculates the blend axial force $T_{BR}$ to the feedback axial force $T_{FB}$ (the feedback axial force calculating unit 11Bb in FIG. 3). In such a way, the feedback axial force $T_{FB}$ switches from the current axial force to the blend axial force $T_{BR}$.

As described above, when the steering returning operation of the steering wheel 1 is performed, the steering control device in one embodiment of the present disclosure sets the blend axial force $T_{BR}$, in which the current axial force and the lateral G axial force are allocated at the preset allocation ratio, to the feedback axial force $T_{FB}$ irrespective of the magnitude of the absolute value of the steering angular velocity dδ/dt.

Here, in the mechanical steering control device in which the steering wheel 1 and the steered wheels 2 are mechanically coupled to each other, the steering reaction force to return the steering wheel 1 to the neutral position is generated by the tire lateral force Fd, which follows the steering of the steered wheels 2, at the time of the steering returning operation of the steering wheel 1. Therefore, in the mechanical steering control device, at the time of the steering returning operation of the steering wheel 1, the driver has reduced the holding force for the steering wheel 1, has slid the steering wheel 1 on the palm, has thereby returned the steering wheel 1 to the neutral position, and has returned the steered wheels 2 to the neutral position. In contrast, in the steering control device in one embodiment of the present disclosure, the blend axial force $T_{BR}$ is set to the feedback axial force $T_{FB}$, whereby the steering reaction force to return the steering wheel 1 to the neutral position can be suppressed from being decreased even if the turning current is decreased and the current axial force is decreased. Therefore, the steering control device in one embodiment of the present disclosure can return the steering wheel 1 to the neutral position in such a manner that the driver reduces the holding force for the steering wheel 1 and slides the steering wheel 1 on the palm in a similar way to the mechanical steering control device. In such a way, at the time of the steering returning operation of the steering wheel 1, the steering control device in one embodiment of the present disclosure can apply more appropriate steering reaction force.

Here, as shown at a time t3 of FIG. 20, it is assumed that, during the steering returning operation of the steering wheel 1 (for example, during the steering in the clockwise direction), the driver performs the steering increasing operation of the steering wheel 1 clockwise subsequently after the steering angle δ goes beyond the neutral position. Moreover, it is assumed that the absolute value of the steering angular velocity dδ/dt is in a range from the fourth setting steering angular velocity $dδ_4$/dt or more to less than the fifth setting steering angular velocity $dδ_5$/dt. Then, as the absolute value of the steering angular velocity dδ/dt becomes smaller, the variable K4 becomes 1.0, the variable K5 is increased, and the allocation ratio GB (=K4×K5) of the current axial force is increased (the feedback axial force calculation executing unit 11Bbe in FIG. 11). Then, the control computing unit 11 allocates the current axial force and the blend axial force $T_{BR}$, which are thus calculated, in the ratio of GB:(1−GB), and calculates the feedback axial force $T_{FB}$ (the feedback axial force calculating unit 11Bb in FIG. 3). In such a way, the feedback axial force $T_{FB}$ gradually shifts from the blend axial force $T_{BR}$ to the current axial force.

As described above, in the case of having determined that the steering increasing operation of the steering wheel 1 is performed, and having determined that the absolute value of the steering angular velocity dδ/dt is the fourth setting steering angular velocity $dδ_4$/dt or more, the steering control device in one embodiment of the present disclosure allocates the current axial force and the blend axial force $T_{BR}$ to set the feedback axial force $T_{FB}$, and in addition, increases the allocation ratio of the current axial force as the absolute value of the steering angular velocity dδ/dt becomes smaller. Therefore, in the case where the steering angle δ goes beyond the neutral position during the steering returning operation of the steering wheel 1 and subsequently the steering increasing operation of the steering wheel 1 is performed in the same direction as that of the steering returning operation, then the steering control device in one embodiment of the present disclosure can gradually shift the feedback axial force $T_{FB}$ from the blend axial force $T_{BR}$ to the current axial force as the absolute value of the steering angular velocity dδ/dt is gradually decreased during the steering increasing operation. In such a way, at such a time of switching from the steering returning operation of the steering wheel 1 to the steering increasing operation therefor, the steering control device in one embodiment of the present disclosure can apply more appropriate steering reaction force.

In one embodiment of the present disclosure, the steering wheel 1 in FIG. 1 composes a steering wheel. In a similar way, the steering angle sensor 3, turning motor 8A and the turning motor drive unit 8C in FIG. 1 compose a turning actuator. Moreover, the turning current detecting unit 8B in FIG. 1 composes a turning current detecting unit. Furthermore, the feedback axial force calculating unit 11Bb in FIG. 3 and the current axial force calculating unit 11Bba in FIG. 11 compose a current axial force calculating unit. Moreover, the lateral G sensor 6 in FIG. 1, the feedback axial force calculating unit 11Bb in FIG. 3 and the blend axial force calculating unit 11Bbb in FIG. 11 compose a lateral G axial force calculating unit. Furthermore, the feedback axial force calculating unit 11Bb and the axial force-steering reaction force converting unit 11Bd in FIG. 3 and the feedback axial force calculation executing unit 11Bbe in FIG. 11 compose a steering reaction force calculating unit. Moreover, the reaction force motor 9A and the reaction force motor drive unit 9C in FIG. 1 and the target reaction force current computing unit 11B in FIG. 2 compose reaction force actuator. Furthermore, the feedback axial force calculating unit 11Bb in FIG. 3 and the feedback axial force calculation executing unit 11Bbe in FIG. 11 compose a feedback axial force calculating unit. Moreover, the axial force-steering reaction force converting unit 11Bd in FIG. 3 composes a steering reaction force calculation executing unit. Furthermore, the lateral G sensor 6 in FIG. 1 composes a lateral acceleration detecting unit.

Effects in the Present Disclosure

The following effects are brought out in one embodiment of the present disclosure
(1) The control computing unit 11 calculates the current axial force of the steering rack based on the turning current. Moreover, the control computing unit 11 calculates the lateral G axial force of the steering rack based on the lateral acceleration Gy. Then, the control computing unit 11 calculates the steering reaction force based on the current axial force at the time of the steering increasing operation of the steering wheel 1, and calculates the steering reaction force based on the current axial force and the lateral G axial force at the time of the steering returning operation of the steering wheel 1.

In accordance with such a configuration, the reaction force motor 9A can be driven based on the detection results of the sensors provided in the general vehicle, the detection results including the turning current, the lateral acceleration Gy, and the like. Therefore, it is not necessary for the steering control device to include the dedicated sensor, and the increase in manufacturing cost can be suppressed.
(2) At the time of the steering returning operation of the steering wheel 1, the control computing unit 11 calculates the steering reaction force based on the blend axial force $T_{BR}$ in which the current axial force and the lateral G axial force are allocated at the preset allocation ratio GB:(1−GB).

In accordance with such a configuration, when the steering returning operation of the steering wheel 1 is performed, since the lateral G axial force is present, the steering reaction force to return the steering wheel 1 to the neutral position can be suppressed from being decreased even if the turning current is decreased and the current axial force is decreased.

Therefore, the steering wheel 1 can be returned to the neutral position in such a manner that the driver reduces the holding force for the steering wheel 1 and slides the steering wheel 1 on the palm. In such a way, at the time of the steering returning operation of the steering wheel 1, more appropriate steering reaction force can be applied.
(3) In the case of having determined that the absolute value of the steering angular velocity dδ/dt is less than the fourth setting steering angular velocity $dδ_4/dt$ at the time of the steering increasing operation of the steering wheel 1, the control computing unit 11 calculates the feedback axial force $T_{FB}$ based on only the current axial force. Subsequently, the control computing unit 11 calculates the steering reaction force based on the calculated feedback axial force $T_{FB}$.

In accordance with such a configuration, for example, when the steering increasing operation of the steering wheel 1 is performed, the steering reaction force to return the steering wheel 1 to the neutral position can be applied. In such a way, at the time of the steering increasing operation of the steering wheel 1, more appropriate steering reaction force can be applied.
(4) In the case of having determined that the absolute value of the steering angular velocity dδ/dt is the fourth setting steering angular velocity $dδ_4/dt$ or more at the time of the steering increasing operation of the steering wheel 1, the control computing unit 11 calculates the feedback axial force $T_{FB}$ by allocating the current axial force and the blend axial force $T_{BR}$. Subsequently, the control computing unit 11 increases the allocation ratio of the current axial force as the absolute value of the steering angular velocity dδ/dt becomes smaller.

In accordance with such a configuration, for example, in the case where the steering angle δ goes beyond the neutral position during the steering returning operation of the steering wheel 1 and subsequently the steering increasing operation of the steering wheel 1 is performed in the same direction as that of the steering returning operation, then the feedback axial force $T_{FB}$ can be gradually shifted from the blend axial force $T_{BR}$ to the current axial force as the absolute value of the steering angular velocity dδ/dt is gradually decreased during the steering increasing operation.
(5) The control computing unit 11 allocates the steering angle δ and the vehicle velocity V in the allocation ratio GF, (1−GF), and calculates the feedforward axial force. Subsequently, the control computing unit 11 drives the reaction force motor 9A based on the feedback axial force and the feedforward axial force.

In accordance with such a configuration, the reaction force motor 9A is driven based on the feedforward axial force in addition to the feedback axial force, and accordingly, more appropriate steering reaction force can be applied.
(6) The lateral G sensor 6 detects the lateral acceleration Gy. Subsequently, the control computing unit 11 calculates the lateral G axial force based on the lateral acceleration Gy detected by the lateral G sensor 6.

In accordance with such a configuration, the reaction force motor 9A can be driven based on the detection result of the lateral G sensor 6.

While the present disclosure has been described with reference to the definite number of embodiments, the scope of the present disclosure is not limited thereto, and improvements and modifications of the embodiments based on the above disclosure are obvious to those skilled in the art.

The invention claimed is:
1. A steering control device, comprising:
 a steering wheel mechanically separated from steered wheels;

a turning actuator configured to turn the steered wheels in accordance with an operation amount for the steering wheel;

a turning current detecting unit configured to detect a turning current flowing through the turning actuator;

a current axial force calculating unit configured to calculate a current axial force of a steering rack based on the turning current;

a lateral G axial force calculating unit configured to calculate a lateral G axial force of the steering rack based on a lateral acceleration acting on a vehicle;

a steering reaction force calculating unit configured to calculate a steering reaction force based on at least either the current axial force calculated by the current axial force calculating unit or the lateral G axial force calculated by the lateral G axial force calculating unit; and a reaction force actuator configured to apply the steering reaction force calculated by the steering reaction force calculating unit, wherein the steering reaction force calculating unit is configured to calculate the steering reaction force based on the current axial force at a time of a steering increasing operation of the steering wheel, and to calculate the steering reaction force based on the current axial force and the lateral G axial force at a time of a steering returning operation of the steering wheel, so that an allocation of the lateral G axial force at the time of the steering returning operation is larger than the allocation of the lateral G axial force at the time of the steering increasing operation.

2. The steering control device according to claim 1, wherein, at the time of the steering returning operation of the steering wheel, the steering reaction force calculating unit is configured to calculate the steering reaction force based on a blend axial force in which the current axial force and the lateral G axial force are allocated at a preset allocation ratio.

3. The steering control device according to claim 2, wherein the steering reaction force calculating unit is configured to include:

a feedback axial force calculating unit configured to calculate a feedback axial force based on only the current axial force in a case where it is determined that an absolute value of a steering angular velocity of the steering wheel is smaller than a setting value at the time of the steering increasing operation of the steering wheel; and a steering reaction force calculation executing unit configured to calculate the steering reaction force based on the feedback axial force calculated by the feedback axial force calculating unit.

4. The steering control device according to claim 3, wherein in a case where it is determined that the absolute value of the steering angular velocity of the steering wheel is equal to or larger than the setting value at the time of the steering increasing operation of the steering wheel, the feedback axial force calculating unit is configured to calculate the feedback axial force by allocating the current axial force and the blend axial force, and to increase an allocation ratio of the current axial force as the absolute value of the steering angular velocity becomes smaller.

5. The steering control device according to claim 3, further comprising a feedforward axial force calculating unit configured to calculate a feedforward axial force based on a steering angle of the steering wheel and the vehicle velocity of the vehicle, wherein the steering reaction force calculation executing unit is configured to allocate, at the preset allocation ratio, the feedback axial force calculated by the feedback axial force calculating unit and the feedforward axial force calculated by the feedforward axial force calculating unit, and to calculate the steering reaction force.

6. The steering control device according to claim 1, further comprising a lateral acceleration detecting unit configured to detect a lateral acceleration of the vehicle, wherein the lateral G axial force calculating unit is configured to calculate the lateral G axial force based on the lateral acceleration detected by the lateral acceleration detecting unit.

7. The steering control device according to claim 4, further comprising a feedforward axial force calculating unit configured to calculate a feedforward axial force based on a steering angle of the steering wheel and the vehicle velocity of the vehicle, wherein the steering reaction force calculation executing unit is configured to allocate, at the preset allocation ratio, the feedback axial force calculated by the feedback axial force calculating unit and the feedforward axial force calculated by the feedforward axial force calculating unit, and to calculate the steering reaction force.

* * * * *